US011515973B2

(12) United States Patent
Mallik et al.

(10) Patent No.: US 11,515,973 B2
(45) Date of Patent: Nov. 29, 2022

(54) INTERFERENCE-AWARE BEAMFORMING

(71) Applicant: XCOM Labs, Inc., San Diego, CA (US)

(72) Inventors: Siddhartha Mallik, San Diego, CA (US); Tamer Adel Kadous, San Diego, CA (US); Ali A. Elghariani, San Diego, CA (US)

(73) Assignee: XCOM Labs, Inc., San Diego, CA (US)

( * ) Notice: Subject to any disclaimer, the term of this patent is extended or adjusted under 35 U.S.C. 154(b) by 6 days.

(21) Appl. No.: 17/325,688

(22) Filed: May 20, 2021

(65) Prior Publication Data

US 2021/0376973 A1 Dec. 2, 2021

Related U.S. Application Data

(60) Provisional application No. 63/030,181, filed on May 26, 2020.

(51) Int. Cl.
*H04W 72/04* (2009.01)
*H04L 5/00* (2006.01)
(Continued)

(52) U.S. Cl.
CPC ......... *H04L 5/0032* (2013.01); *H04B 7/0408* (2013.01); *H04B 7/0413* (2013.01);
(Continued)

(58) Field of Classification Search
CPC ... H04L 5/0023; H04L 5/0032; H04L 5/0051; H04B 7/0408; H04B 7/0413;
(Continued)

(56) References Cited

U.S. PATENT DOCUMENTS 6,636,568 B2  10/2003  Kadous
6,801,580 B2  10/2004  Kadous
(Continued)

FOREIGN PATENT DOCUMENTS

KR   10-2016-0028091   3/2016

OTHER PUBLICATIONS

International Search Report and Written Opinion for International Application No. PCT/US2021/032986, Notification dated Aug. 5, 2021.

(Continued)

*Primary Examiner* — Siu M Lee
(74) *Attorney, Agent, or Firm* — Knobbe Martens Olson & Bear LLP

(57) ABSTRACT

Aspects of the disclosure relate to an interference-aware beamforming environment in which an AP controller can determine one or more beams of one or more APs to serve various STAs. For example, an AP can request that STA(s) provide one or more uplink pilot signals during different time slots. The AP can receive the uplink pilot signal(s) and determine, for each STA, the uplink beam quality of each transmit beam-receive beam pair over which an uplink pilot signal was received from the respective STA. The AP can use reciprocity to determine, for each STA, the downlink beam quality for various transmit beam-receive beam pairs. The AP can use the determined downlink beam quality to identify the best beam with which to serve various STAs. An AP controller can determine which downlink beam(s) an AP should use to serve a STA based on the downlink beams originally selected by the APs.

21 Claims, 9 Drawing Sheets

(51) Int. Cl.
*H04B 7/0408* (2017.01)
*H04W 72/08* (2009.01)
*H04W 72/10* (2009.01)
*H04B 7/0413* (2017.01)

(52) U.S. Cl.
CPC ..... *H04W 72/044* (2013.01); *H04W 72/0433* (2013.01); *H04W 72/085* (2013.01); *H04W 72/10* (2013.01)

(58) Field of Classification Search
CPC ............ H04B 7/0695; H04W 72/0433; H04W 72/044; H04W 72/046; H04W 72/085; H04W 72/10; H04W 28/16
See application file for complete search history.

(56) References Cited

U.S. PATENT DOCUMENTS

| | | |
|---|---|---|
| 6,873,606 B2 | 3/2005 | Agrawal et al. |
| 6,917,821 B2 | 7/2005 | Kadous |
| 6,928,062 B2 | 8/2005 | Krishnan et al. |
| 7,012,883 B2 | 3/2006 | Jalali et al. |
| 7,020,073 B2 | 3/2006 | Kadous |
| 7,039,001 B2 | 5/2006 | Krishnan et al. |
| 7,042,857 B2 | 5/2006 | Krishnan et al. |
| 7,095,790 B2 | 8/2006 | Krishnan et al. |
| 7,145,940 B2 | 12/2006 | Gore et al. |
| 7,167,684 B2 | 1/2007 | Kadous |
| 7,177,351 B2 | 2/2007 | Kadous |
| 7,184,713 B2 | 2/2007 | Kadous |
| 7,194,041 B2 | 3/2007 | Kadous |
| 7,236,535 B2 | 6/2007 | Subramaniam et al. |
| 7,418,046 B2 | 8/2008 | Gore et al. |
| 7,428,269 B2 | 9/2008 | Sampath et al. |
| 7,457,639 B2 | 11/2008 | Subramaniam et al. |
| 7,463,576 B2 | 12/2008 | Krishnan et al. |
| 7,477,693 B2 | 1/2009 | Subramaniam et al. |
| 7,508,748 B2 | 3/2009 | Kadous |
| 7,567,621 B2 | 7/2009 | Sampath et al. |
| 7,606,326 B2 | 10/2009 | Krishnan et al. |
| 7,668,125 B2 | 2/2010 | Kadous |
| 7,675,886 B2 | 3/2010 | Agrawal et al. |
| 7,725,799 B2 | 5/2010 | Walker et al. |
| 7,890,144 B2 | 2/2011 | Subramaniam et al. |
| 7,903,615 B2 | 3/2011 | Gorokhov et al. |
| 7,940,663 B2 | 5/2011 | Kadous |
| 7,948,959 B2 | 5/2011 | Wang et al. |
| 7,974,359 B2 | 7/2011 | Gorokhov et al. |
| 8,014,331 B2 | 9/2011 | Sarkar et al. |
| 8,073,068 B2 | 12/2011 | Kim et al. |
| 8,077,654 B2 | 12/2011 | Sutivong et al. |
| 8,077,691 B2 | 12/2011 | Kadous |
| 8,098,635 B2 | 1/2012 | Montojo et al. |
| 8,107,517 B2 | 1/2012 | Naguib et al. |
| 8,139,672 B2 | 3/2012 | Gore et al. |
| 8,204,530 B2 | 6/2012 | Gorokhov et al. |
| 8,229,423 B2 | 7/2012 | Sarkar et al. |
| 8,306,096 B2 | 11/2012 | Sampath et al. |
| 8,331,310 B2 | 12/2012 | Wang et al. |
| 8,331,892 B2 | 12/2012 | Kadous |
| 8,340,605 B2 | 12/2012 | Hou et al. |
| 8,351,456 B2 | 1/2013 | Kadous |
| 8,379,705 B2 | 2/2013 | Mallik |
| 8,385,433 B2 | 2/2013 | Wang et al. |
| 8,385,465 B2 | 2/2013 | Kadous |
| 8,391,196 B2 | 3/2013 | Gorokhov et al. |
| 8,391,413 B2 | 3/2013 | Mantravadi et al. |
| 8,432,821 B2 | 4/2013 | Gorokhov et al. |
| 8,451,740 B2 | 5/2013 | Sampath et al. |
| 8,451,776 B2 | 5/2013 | Dayal et al. |
| 8,457,152 B2 | 6/2013 | Gorokhov et al. |
| 8,457,221 B2 | 6/2013 | Palanki et al. |
| 8,462,859 B2 | 6/2013 | Sampath et al. |
| 8,493,958 B2 | 7/2013 | Attar et al. |
| 8,498,192 B2 | 7/2013 | Bhushan et al. |
| 8,498,647 B2 | 7/2013 | Gorokhov et al. |
| 8,526,347 B2 | 9/2013 | Wang et al. |
| 8,576,742 B2 | 11/2013 | Yoo et al. |
| 8,576,760 B2 | 11/2013 | Gorokhov et al. |
| 8,588,801 B2 | 11/2013 | Gorokhov et al. |
| 8,605,729 B2 | 12/2013 | Dayal et al. |
| 8,614,981 B2 | 12/2013 | Mallik |
| 8,619,717 B2 | 12/2013 | Agrawal et al. |
| 8,634,435 B2 | 1/2014 | Kadous |
| 8,639,190 B2 | 1/2014 | Gore et al. |
| 8,654,705 B2 | 2/2014 | Wang et al. |
| 8,654,715 B2 | 2/2014 | Wang et al. |
| 8,655,400 B2 | 2/2014 | Kadous |
| 8,675,511 B2 | 3/2014 | Gorokhov et al. |
| 8,675,560 B2 | 3/2014 | Yoo et al. |
| 8,676,209 B2 | 3/2014 | Gorokhov et al. |
| 8,724,545 B2 | 5/2014 | Dayal et al. |
| 8,724,555 B2 | 5/2014 | Krishnan et al. |
| 8,737,470 B2 | 5/2014 | Walker et al. |
| 8,760,994 B2 | 6/2014 | Wang et al. |
| 8,767,885 B2 | 7/2014 | Sampath et al. |
| 8,781,005 B2 | 7/2014 | Mallik |
| 8,787,183 B2 | 7/2014 | Mallik |
| 8,812,657 B2 | 8/2014 | Mallik |
| 8,817,924 B2 | 8/2014 | Mallik |
| 8,825,860 B2 | 9/2014 | Linsky et al. |
| 8,830,934 B2 | 9/2014 | Banister et al. |
| 8,842,693 B2 | 9/2014 | Agrawal et al. |
| 8,848,607 B2 | 9/2014 | Wang et al. |
| 8,855,000 B2 | 10/2014 | Mallik |
| 8,855,001 B2 | 10/2014 | Gorokhov et al. |
| 8,874,998 B2 | 10/2014 | Walker et al. |
| 8,879,445 B2 | 11/2014 | Sadek et al. |
| 8,885,744 B2 | 11/2014 | Kadous |
| 8,886,126 B2 | 11/2014 | Mantravadi et al. |
| 8,886,239 B2 | 11/2014 | Dayal et al. |
| 8,897,181 B2 | 11/2014 | Wang et al. |
| 8,897,220 B2 | 11/2014 | Kadous |
| 8,903,021 B2 | 12/2014 | Mantravadi et al. |
| 8,908,496 B2 | 12/2014 | Kadous |
| 8,923,109 B2 | 12/2014 | Wang et al. |
| 8,923,208 B2 | 12/2014 | Dayal et al. |
| 8,954,063 B2 | 2/2015 | Sarkar et al. |
| 8,971,461 B2 | 3/2015 | Sampath et al. |
| 8,971,823 B2 | 3/2015 | Gore et al. |
| 8,976,662 B2 | 3/2015 | Somasundaram et al. |
| 9,036,538 B2 | 5/2015 | Palanki et al. |
| 9,071,315 B2 | 6/2015 | Huang et al. |
| 9,088,389 B2 | 7/2015 | Gorokhov et al. |
| 9,106,287 B2 | 8/2015 | Wang et al. |
| 9,107,056 B2 | 8/2015 | Damnjanovic et al. |
| 9,113,488 B2 | 8/2015 | Oguz et al. |
| 9,136,953 B2 | 9/2015 | Yoo et al. |
| 9,136,974 B2 | 9/2015 | Gorokhov et al. |
| 9,143,957 B2 | 9/2015 | Sadek et al. |
| 9,144,036 B2 | 9/2015 | Gorokhov et al. |
| 9,144,084 B2 | 9/2015 | Sadek et al. |
| 9,148,256 B2 | 9/2015 | Sampath et al. |
| 9,154,179 B2 | 10/2015 | Gudem et al. |
| 9,154,211 B2 | 10/2015 | Sampath et al. |
| 9,155,106 B2 | 10/2015 | Krishnan et al. |
| 9,161,232 B2 | 10/2015 | Linsky et al. |
| 9,161,233 B2 | 10/2015 | Wang et al. |
| 9,172,402 B2 | 10/2015 | Gudem et al. |
| 9,172,453 B2 | 10/2015 | Wang et al. |
| 9,179,319 B2 | 11/2015 | Gore et al. |
| 9,184,870 B2 | 11/2015 | Sampath et al. |
| 9,185,718 B2 | 11/2015 | Kadous |
| 9,185,720 B2 | 11/2015 | Mantravadi et al. |
| 9,210,605 B2 | 12/2015 | Yoo et al. |
| 9,226,173 B2 | 12/2015 | Sadek et al. |
| 9,237,434 B2 | 1/2016 | Mallik |
| 9,246,560 B2 | 1/2016 | Sampath et al. |
| 9,253,658 B2 | 2/2016 | Sadek et al. |
| 9,264,183 B2 | 2/2016 | Gorokhov et al. |
| 9,265,047 B2 | 2/2016 | Mallik |
| 9,270,441 B2 | 2/2016 | Mallik |
| 9,277,564 B2 | 3/2016 | Wang et al. |
| 9,282,462 B2 | 3/2016 | Dayal et al. |

(56) References Cited

U.S. PATENT DOCUMENTS

| | | | |
|---|---|---|---|
| 9,307,544 | B2 | 4/2016 | Gore et al. |
| 9,351,307 | B2 | 5/2016 | Luo et al. |
| 9,398,602 | B2 | 7/2016 | Kadous |
| 9,408,220 | B2 | 8/2016 | Gore et al. |
| 9,451,480 | B2 | 9/2016 | Huang et al. |
| 9,461,736 | B2 | 10/2016 | Bhushan et al. |
| 9,474,051 | B2 | 10/2016 | Wilson et al. |
| 9,474,075 | B2 | 10/2016 | Yavuz et al. |
| 9,485,069 | B2 | 11/2016 | Wang et al. |
| 9,497,765 | B2 | 11/2016 | Yoo et al. |
| 9,521,554 | B2 | 12/2016 | Farajidana et al. |
| 9,578,649 | B2 | 2/2017 | Dayal et al. |
| 9,585,156 | B2 | 2/2017 | Bhattad et al. |
| 9,660,776 | B2 | 5/2017 | Kadous |
| 9,693,323 | B2 | 6/2017 | Mallik |
| 9,750,014 | B2 | 8/2017 | Sadek et al. |
| 9,755,705 | B2 | 9/2017 | Hou et al. |
| 9,780,847 | B2 | 10/2017 | Budianu et al. |
| 9,788,361 | B2 | 10/2017 | Valliappan et al. |
| 9,813,497 | B2 | 11/2017 | Mallik |
| 9,832,785 | B2 | 11/2017 | Kadous |
| 9,860,033 | B2 | 1/2018 | Kadous |
| 9,867,194 | B2 | 1/2018 | Kadous |
| 9,877,203 | B2 | 1/2018 | Yoo et al. |
| 9,882,623 | B2 | 1/2018 | Sun et al. |
| 9,900,074 | B2 | 2/2018 | Mallik |
| 9,924,368 | B2 | 3/2018 | Valliappan et al. |
| 9,929,835 | B2 | 3/2018 | Dabeer et al. |
| 9,936,400 | B2 | 4/2018 | Lee et al. |
| 9,942,801 | B2 | 4/2018 | Yerramalli et al. |
| 9,954,668 | B2 | 4/2018 | Lee et al. |
| 9,961,579 | B2 | 5/2018 | Geirhofer et al. |
| 9,967,729 | B2 | 5/2018 | Wang et al. |
| 9,973,923 | B2 | 5/2018 | Damnjanovic et al. |
| 9,991,989 | B2 | 6/2018 | Malladi et al. |
| 9,992,004 | B2 | 6/2018 | Mallik et al. |
| 10,009,053 | B2 | 6/2018 | Somasundaram et al. |
| 10,020,911 | B2 | 7/2018 | Mallik |
| 10,021,677 | B2 | 7/2018 | Mallik |
| 10,028,332 | B2 | 7/2018 | Mallik |
| 10,033,558 | B2 | 7/2018 | Yoo et al. |
| 10,034,269 | B2 | 7/2018 | Sun et al. |
| 10,044,438 | B2 | 8/2018 | Kadous |
| 10,044,459 | B2 | 8/2018 | Chendamarai Kannan et al. |
| 10,085,283 | B2 | 9/2018 | Yoo et al. |
| 10,091,789 | B2 | 10/2018 | Valliappan et al. |
| 10,098,140 | B2 | 10/2018 | Mallik |
| 10,123,323 | B2 | 11/2018 | Mallik |
| 10,136,333 | B2 | 11/2018 | Yoo et al. |
| 10,136,452 | B2 | 11/2018 | Liu et al. |
| 10,143,005 | B2 | 11/2018 | Chendamarai Kannan et al. |
| 10,149,293 | B2 | 12/2018 | Damnjanovic et al. |
| 10,149,318 | B2 | 12/2018 | Sun et al. |
| 10,178,649 | B2 | 1/2019 | Liu et al. |
| 10,182,404 | B2 | 1/2019 | Prakash et al. |
| 10,187,900 | B2 | 1/2019 | Zhang et al. |
| 10,200,904 | B2 | 2/2019 | Zhang et al. |
| 10,201,014 | B2 | 2/2019 | Kadous |
| 10,206,117 | B2 | 2/2019 | Damnjanovic et al. |
| 10,218,406 | B2 | 2/2019 | Liu et al. |
| 10,219,235 | B2 | 2/2019 | Patel et al. |
| 10,219,252 | B2 | 2/2019 | Chendamarai Kannan et al. |
| 10,219,292 | B2 | 2/2019 | Damnjanovic et al. |
| 10,219,300 | B2 | 2/2019 | Gorokhov et al. |
| 10,225,818 | B2 | 3/2019 | Liu et al. |
| 10,231,131 | B2 | 3/2019 | Zhang et al. |
| 10,231,132 | B2 | 3/2019 | Zhang et al. |
| 10,244,399 | B2 | 3/2019 | Damnjanovic et al. |
| 10,250,678 | B2 | 4/2019 | Mallik |
| 10,257,848 | B2 | 4/2019 | Sun et al. |
| 10,257,851 | B2 | 4/2019 | Patel et al. |
| 10,264,541 | B2 | 4/2019 | Patel et al. |
| 10,270,579 | B2 | 4/2019 | Chendamarai Kannan et al. |
| 10,278,177 | B2 | 4/2019 | Sadek et al. |
| 10,285,117 | B2 | 5/2019 | Yoo et al. |
| 10,291,379 | B2 | 5/2019 | Kadous |
| 10,292,093 | B2 | 5/2019 | Chendamarai Kannan et al. |
| 10,298,289 | B2 | 5/2019 | Yerramalli et al. |
| 10,299,284 | B2 | 5/2019 | Sadek et al. |
| 10,312,987 | B2 | 6/2019 | Mallik |
| 10,327,241 | B2 | 6/2019 | Kadous |
| 10,327,261 | B2 | 6/2019 | Naghshvar et al. |
| 10,333,595 | B2 | 6/2019 | Fakoorian et al. |
| 10,333,668 | B2 | 6/2019 | Yoo et al. |
| 10,334,546 | B2 | 6/2019 | Chendamarai Kannan et al. |
| 10,341,884 | B2 | 7/2019 | Sun et al. |
| 10,349,404 | B2 | 7/2019 | Chendamarai Kannan et al. |
| 10,356,626 | B2 | 7/2019 | Montojo et al. |
| 10,356,816 | B2 | 7/2019 | Valliappan et al. |
| 10,362,574 | B2 | 7/2019 | Chendamarai Kannan et al. |
| 10,368,301 | B2 | 7/2019 | Chendamarai Kannan et al. |
| 10,368,305 | B2 | 7/2019 | Radulescu et al. |
| 10,368,348 | B2 | 7/2019 | Chendamarai Kannan et al. |
| 10,374,777 | B2 | 8/2019 | Kadous |
| 10,375,711 | B2 | 8/2019 | Sadek et al. |
| 10,389,479 | B2 | 8/2019 | Yoo et al. |
| 10,397,754 | B2 | 8/2019 | Vajapeyam et al. |
| 10,397,796 | B2 | 8/2019 | Sun et al. |
| 10,404,434 | B2 | 9/2019 | Kannan et al. |
| 10,404,509 | B2 | 9/2019 | Sun et al. |
| 10,405,228 | B2 | 9/2019 | Liu et al. |
| 10,405,242 | B2 | 9/2019 | Kadous |
| 10,405,262 | B2 | 9/2019 | Chendamarai Kannan et al. |
| 10,405,335 | B2 | 9/2019 | Barghi et al. |
| 10,411,795 | B2 | 9/2019 | Liu et al. |
| 10,412,704 | B2 | 9/2019 | Sun et al. |
| 10,425,826 | B2 | 9/2019 | Fakoorian et al. |
| 10,425,945 | B2 | 9/2019 | Sun et al. |
| 10,433,179 | B2 | 10/2019 | Zhang et al. |
| 10,448,296 | B2 | 10/2019 | Radulescu et al. |
| 10,455,455 | B2 | 10/2019 | Yoo et al. |
| 10,455,457 | B2 | 10/2019 | Sadek et al. |
| 10,461,797 | B2 | 10/2019 | Liu et al. |
| 10,462,676 | B2 | 10/2019 | Mallik |
| 10,470,048 | B2 | 11/2019 | Zhang et al. |
| 10,470,112 | B2 | 11/2019 | Damnjanovic et al. |
| 10,476,781 | B2 | 11/2019 | Luo et al. |
| 10,477,437 | B2 | 11/2019 | Zhang et al. |
| 10,477,526 | B2 | 11/2019 | Chendamarai Kannan et al. |
| 10,484,135 | B2 | 11/2019 | Mallik |
| 10,484,212 | B2 | 11/2019 | Yoo et al. |
| 10,484,878 | B2 | 11/2019 | Patel et al. |
| 10,484,934 | B2 | 11/2019 | Malik et al. |
| 10,484,935 | B2 | 11/2019 | Li et al. |
| 10,484,954 | B2 | 11/2019 | Liu et al. |
| 10,484,959 | B2 | 11/2019 | Liu et al. |
| 10,484,992 | B2 | 11/2019 | Sadek et al. |
| 10,485,027 | B2 | 11/2019 | Mallik |
| 10,492,220 | B2 | 11/2019 | Sun et al. |
| 10,499,394 | B2 | 12/2019 | Damnjanovic et al. |
| 10,506,629 | B2 | 12/2019 | Sun et al. |
| 10,511,399 | B2 | 12/2019 | Sun et al. |
| 10,511,987 | B2 | 12/2019 | Liu et al. |
| 10,516,618 | B2 | 12/2019 | Barghi et al. |
| 10,523,300 | B2 | 12/2019 | Malik et al. |
| 10,524,279 | B2 | 12/2019 | Yoo et al. |
| 10,536,195 | B2 | 1/2020 | Sun et al. |
| 10,536,944 | B2 | 1/2020 | Zhang et al. |
| 10,536,966 | B2 | 1/2020 | Liu et al. |
| 10,541,851 | B2 | 1/2020 | Malik et al. |
| 10,542,436 | B2 | 1/2020 | Liu et al. |
| 10,542,541 | B2 | 1/2020 | Valliappan et al. |
| 10,542,543 | B2 | 1/2020 | Yerramalli et al. |
| 10,542,556 | B2 | 1/2020 | Mallik |
| 10,547,422 | B2 | 1/2020 | Yoo et al. |
| 10,547,494 | B2 | 1/2020 | Liu et al. |
| 10,548,020 | B2 | 1/2020 | Khoshnevisan et al. |
| 10,548,131 | B2 | 1/2020 | Yerramalli et al. |
| 10,548,153 | B2 | 1/2020 | Akkarakaran et al. |
| 10,554,539 | B2 | 2/2020 | Luo et al. |
| 10,554,540 | B2 | 2/2020 | Luo et al. |
| 10,555,203 | B2 | 2/2020 | Malik et al. |
| 10,555,220 | B2 | 2/2020 | Yerramalli et al. |
| 10,560,304 | B2 | 2/2020 | Lei et al. |

(56) References Cited

U.S. PATENT DOCUMENTS

| | | |
|---|---|---|
| 10,574,422 B2 | 2/2020 | Wang et al. |
| 10,574,565 B2 | 2/2020 | Luo et al. |
| 10,575,185 B2 | 2/2020 | Li et al. |
| 10,581,568 B2 | 3/2020 | Mallik |
| 10,581,572 B2 | 3/2020 | Chendamarai Kannan et al. |
| 10,581,722 B2 | 3/2020 | Luo et al. |
| 10,587,497 B2 | 3/2020 | Luo et al. |
| 10,595,327 B2 | 3/2020 | Sadek et al. |
| 10,595,342 B2 | 3/2020 | Islam et al. |
| 10,602,543 B2 | 3/2020 | Sun et al. |
| 10,602,545 B2 | 3/2020 | Mallik |
| 10,609,660 B2 | 3/2020 | Liu et al. |
| 10,609,664 B2 | 3/2020 | Zhang et al. |
| 10,616,737 B2 | 4/2020 | Liu et al. |
| 10,616,771 B2 | 4/2020 | Montojo et al. |
| 10,616,912 B2 | 4/2020 | Chendamarai Kannan et al. |
| 10,623,163 B2 | 4/2020 | Sun et al. |
| 2003/0181163 A1* | 9/2003 | Ofuji .................. H04W 72/046 455/25 |
| 2004/0121730 A1 | 6/2004 | Kadous |
| 2006/0203794 A1 | 9/2006 | Sampath et al. |
| 2007/0041457 A1 | 2/2007 | Kadous |
| 2007/0071147 A1 | 3/2007 | Sampath et al. |
| 2007/0165738 A1 | 7/2007 | Barriac et al. |
| 2008/0025241 A1 | 1/2008 | Bhushan et al. |
| 2008/0112495 A1 | 5/2008 | Gore et al. |
| 2010/0003931 A1 | 1/2010 | Krishnan et al. |
| 2010/0067422 A1 | 3/2010 | Kadous |
| 2010/0087149 A1 | 4/2010 | Srinivasan et al. |
| 2011/0007680 A1 | 1/2011 | Kadous |
| 2011/0007688 A1 | 1/2011 | Veeravalli et al. |
| 2011/0256834 A1 | 10/2011 | Dayal et al. |
| 2012/0026940 A1 | 2/2012 | Barbieri et al. |
| 2012/0077532 A1 | 3/2012 | Kadous |
| 2012/0113906 A1 | 5/2012 | Kadous |
| 2012/0140798 A1 | 6/2012 | Kadous |
| 2012/0201158 A1 | 8/2012 | Geirhofer et al. |
| 2012/0213303 A1 | 8/2012 | Kadous |
| 2012/0314655 A1 | 12/2012 | Xue et al. |
| 2013/0058276 A1 | 3/2013 | Somasundaram et al. |
| 2013/0194948 A1 | 8/2013 | Mallik |
| 2013/0229935 A1 | 9/2013 | Gorokhov et al. |
| 2013/0294275 A1 | 11/2013 | Gorokhov et al. |
| 2013/0336193 A1 | 12/2013 | Luo et al. |
| 2013/0336249 A1 | 12/2013 | Zhao et al. |
| 2014/0023001 A1 | 1/2014 | Huang et al. |
| 2014/0029456 A1 | 1/2014 | Mallik |
| 2014/0071894 A1 | 3/2014 | Kairouz et al. |
| 2014/0079155 A1 | 3/2014 | Wang et al. |
| 2014/0204857 A1 | 7/2014 | Mallik |
| 2014/0219117 A1 | 8/2014 | Meshkati et al. |
| 2014/0219243 A1 | 8/2014 | Meshkati et al. |
| 2014/0269370 A1* | 9/2014 | Dharanipragada ... H04W 24/02 370/252 |
| 2014/0273884 A1 | 9/2014 | Mantravadi et al. |
| 2014/0301309 A1 | 10/2014 | Luo et al. |
| 2015/0063150 A1 | 3/2015 | Sadek et al. |
| 2015/0063151 A1 | 3/2015 | Sadek et al. |
| 2015/0063323 A1 | 3/2015 | Sadek et al. |
| 2015/0065152 A1 | 3/2015 | Sadek et al. |
| 2015/0085686 A1 | 3/2015 | Chande et al. |
| 2015/0133184 A1 | 5/2015 | Sadek et al. |
| 2015/0139015 A1 | 5/2015 | Kadous |
| 2015/0163823 A1 | 6/2015 | Sadek et al. |
| 2015/0180622 A1 | 6/2015 | Yoo et al. |
| 2015/0282077 A1 | 10/2015 | Yavuz et al. |
| 2015/0319702 A1 | 11/2015 | Patel et al. |
| 2015/0350919 A1 | 12/2015 | Patel et al. |
| 2016/0036572 A1* | 2/2016 | Bhanage .............. H04B 7/0617 370/329 |
| 2016/0088625 A1 | 3/2016 | Kadous |
| 2016/0095039 A1 | 3/2016 | Valliappan et al. |
| 2016/0095040 A1 | 3/2016 | Valliappan et al. |
| 2016/0112168 A1 | 4/2016 | Yoo et al. |
| 2016/0128130 A1 | 5/2016 | Sadek et al. |
| 2016/0234820 A1 | 8/2016 | Mallik |
| 2016/0353482 A1 | 12/2016 | Valliappan et al. |
| 2016/0381673 A1 | 12/2016 | Sun et al. |
| 2017/0026976 A1 | 1/2017 | Yoo et al. |
| 2017/0033854 A1* | 2/2017 | Yoo ..................... H04B 7/0408 |
| 2017/0041766 A1 | 2/2017 | Vajapeyam et al. |
| 2017/0048047 A1 | 2/2017 | Kadous |
| 2017/0055260 A1 | 2/2017 | Valliappan et al. |
| 2017/0055285 A1 | 2/2017 | Valliappan et al. |
| 2017/0064657 A1 | 3/2017 | Chendamarai Kannan et al. |
| 2017/0064729 A1 | 3/2017 | Sadek et al. |
| 2017/0093545 A1 | 3/2017 | Kadous |
| 2017/0094680 A1 | 3/2017 | Patel et al. |
| 2017/0135029 A1 | 5/2017 | Chendamarai Kannan et al. |
| 2017/0142705 A1 | 5/2017 | Chendamarai Kannan et al. |
| 2017/0142713 A1 | 5/2017 | Chendamarai Kannan et al. |
| 2017/0163433 A1 | 6/2017 | Luo et al. |
| 2017/0202022 A1 | 7/2017 | Chendamarai Kannan et al. |
| 2017/0222771 A1 | 8/2017 | Chendamarai Kannan et al. |
| 2017/0223737 A1 | 8/2017 | Patel et al. |
| 2017/0223739 A1 | 8/2017 | Mallik |
| 2017/0280382 A1 | 9/2017 | Radulescu et al. |
| 2017/0311316 A1 | 10/2017 | Chendamarai Kannan et al. |
| 2017/0311343 A1 | 10/2017 | Chendamarai Kannan et al. |
| 2017/0311346 A1 | 10/2017 | Chendamarai Kannan et al. |
| 2017/0332288 A1 | 11/2017 | Sadek et al. |
| 2017/0332338 A1 | 11/2017 | Mallik |
| 2017/0359263 A1 | 12/2017 | Barghi et al. |
| 2017/0359815 A1 | 12/2017 | Chendamarai Kannan et al. |
| 2018/0032516 A1 | 2/2018 | Mallik |
| 2018/0035463 A1 | 2/2018 | Mallik |
| 2018/0054348 A1 | 2/2018 | Luo et al. |
| 2018/0054382 A1 | 2/2018 | Luo et al. |
| 2018/0054762 A1 | 2/2018 | Kadous |
| 2018/0054780 A1 | 2/2018 | Radulescu et al. |
| 2018/0054783 A1 | 2/2018 | Luo et al. |
| 2018/0054811 A1 | 2/2018 | Luo et al. |
| 2018/0054812 A1 | 2/2018 | Luo et al. |
| 2018/0054830 A1 | 2/2018 | Luo et al. |
| 2018/0054832 A1 | 2/2018 | Luo et al. |
| 2018/0054848 A1 | 2/2018 | Yoo et al. |
| 2018/0062801 A1 | 3/2018 | Zhang et al. |
| 2018/0070242 A1 | 3/2018 | Damnjanovic et al. |
| 2018/0070243 A1 | 3/2018 | Liu et al. |
| 2018/0077725 A1 | 3/2018 | Sun et al. |
| 2018/0084430 A1 | 3/2018 | Patel et al. |
| 2018/0098335 A1 | 4/2018 | Sun et al. |
| 2018/0103461 A1 | 4/2018 | Sun et al. |
| 2018/0110056 A1 | 4/2018 | Zhang et al. |
| 2018/0115933 A1 | 4/2018 | Radulescu et al. |
| 2018/0123859 A1 | 5/2018 | Liu et al. |
| 2018/0124770 A1 | 5/2018 | Yerramalli et al. |
| 2018/0124776 A1 | 5/2018 | Yerramalli et al. |
| 2018/0124777 A1 | 5/2018 | Yerramalli et al. |
| 2018/0124789 A1 | 5/2018 | Yerramalli et al. |
| 2018/0124820 A1 | 5/2018 | Sun et al. |
| 2018/0131499 A1 | 5/2018 | Zhang et al. |
| 2018/0132236 A1 | 5/2018 | Kadous |
| 2018/0139616 A1 | 5/2018 | Khoshnevisan et al. |
| 2018/0139618 A1 | 5/2018 | Yerramalli et al. |
| 2018/0146480 A1 | 5/2018 | Chendamarai Kannan et al. |
| 2018/0160328 A1 | 6/2018 | Chendamarai Kannan et al. |
| 2018/0160389 A1 | 6/2018 | Yerramalli et al. |
| 2018/0167848 A1 | 6/2018 | Lei et al. |
| 2018/0167941 A1 | 6/2018 | Zhang et al. |
| 2018/0167968 A1 | 6/2018 | Liu et al. |
| 2018/0175986 A1 | 6/2018 | Chendamarai Kannan et al. |
| 2018/0176946 A1 | 6/2018 | Sun et al. |
| 2018/0213486 A1 | 7/2018 | Yoo et al. |
| 2018/0213560 A1 | 7/2018 | Naghshvar et al. |
| 2018/0220428 A1 | 8/2018 | Sun et al. |
| 2018/0227011 A1 | 8/2018 | Yerramalli et al. |
| 2018/0227771 A1 | 8/2018 | Malik et al. |
| 2018/0227797 A1 | 8/2018 | Liu et al. |
| 2018/0227936 A1 | 8/2018 | Yerramalli et al. |
| 2018/0227944 A1 | 8/2018 | Yerramalli et al. |
| 2018/0234830 A1 | 8/2018 | Wang et al. |
| 2018/0241494 A1 | 8/2018 | Chendamarai Kannan et al. |
| 2018/0241526 A1 | 8/2018 | Chendamarai Kannan et al. |

(56) References Cited

U.S. PATENT DOCUMENTS

| | | |
|---|---|---|
| 2018/0242223 A1 | 8/2018 | Chendamarai Kannan et al. |
| 2018/0242232 A1 | 8/2018 | Chendamarai Kannan et al. |
| 2018/0242348 A1 | 8/2018 | Chendamarai Kannan et al. |
| 2018/0249380 A1 | 8/2018 | Zhang et al. |
| 2018/0249496 A1 | 8/2018 | Radulescu et al. |
| 2018/0255561 A1 | 9/2018 | Barghi et al. |
| 2018/0255584 A1 | 9/2018 | Sun et al. |
| 2018/0269962 A1 | 9/2018 | Liu et al. |
| 2018/0279134 A1 | 9/2018 | Malik et al. |
| 2018/0279156 A1 | 9/2018 | Malik et al. |
| 2018/0279212 A1 | 9/2018 | Malik et al. |
| 2018/0279292 A1 | 9/2018 | Luo et al. |
| 2018/0287762 A1 | 10/2018 | Sun et al. |
| 2018/0287840 A1 | 10/2018 | Akkarakaran et al. |
| 2018/0287870 A1 | 10/2018 | Yerramalli et al. |
| 2018/0288747 A1 | 10/2018 | Sun et al. |
| 2018/0288749 A1 | 10/2018 | Sun et al. |
| 2018/0288781 A1 | 10/2018 | Akkarakaran et al. |
| 2018/0294911 A1 | 10/2018 | Sun et al. |
| 2018/0295622 A1 | 10/2018 | Sadek et al. |
| 2018/0302186 A1 | 10/2018 | Reddy et al. |
| 2018/0302201 A1 | 10/2018 | Yoo et al. |
| 2018/0302796 A1 | 10/2018 | Zhang et al. |
| 2018/0309479 A1 | 10/2018 | Yerramalli et al. |
| 2018/0310267 A1 | 10/2018 | Liu et al. |
| 2018/0310341 A1 | 10/2018 | Yerramalli et al. |
| 2018/0317093 A1 | 11/2018 | Li et al. |
| 2018/0317259 A1 | 11/2018 | Islam et al. |
| 2018/0324713 A1 | 11/2018 | Yoo et al. |
| 2018/0331870 A1 | 11/2018 | Sun et al. |
| 2018/0332551 A1 | 11/2018 | Liu et al. |
| 2018/0343156 A1 | 11/2018 | Malik et al. |
| 2018/0343588 A1 | 11/2018 | Sadek et al. |
| 2018/0343676 A1 | 11/2018 | Yerramalli et al. |
| 2018/0352520 A1 | 12/2018 | Zhang et al. |
| 2018/0352563 A1 | 12/2018 | Liu et al. |
| 2018/0359656 A1 | 12/2018 | Liu et al. |
| 2018/0359685 A1 | 12/2018 | Li et al. |
| 2018/0367362 A1 | 12/2018 | Sun et al. |
| 2018/0368089 A1 | 12/2018 | Yerramalli et al. |
| 2018/0376503 A1 | 12/2018 | Sun et al. |
| 2019/0007946 A1 | 1/2019 | Yerramalli et al. |
| 2019/0014481 A1 | 1/2019 | Yerramalli et al. |
| 2019/0014507 A1 | 1/2019 | Zhang et al. |
| 2019/0014589 A1 | 1/2019 | Yerramalli et al. |
| 2019/0020424 A1 | 1/2019 | Yerramalli et al. |
| 2019/0020461 A1 | 1/2019 | Yerramalli et al. |
| 2019/0020522 A1 | 1/2019 | Sun et al. |
| 2019/0020527 A1 | 1/2019 | Lei et al. |
| 2019/0020528 A1 | 1/2019 | Lei et al. |
| 2019/0020529 A1 | 1/2019 | Lei et al. |
| 2019/0021080 A1 | 1/2019 | Lei et al. |
| 2019/0028999 A1 | 1/2019 | Yerramalli et al. |
| 2019/0029019 A1 | 1/2019 | Zhang et al. |
| 2019/0037376 A1 | 1/2019 | Liu et al. |
| 2019/0037427 A1 | 1/2019 | Yerramalli et al. |
| 2019/0037481 A1 | 1/2019 | Zhang et al. |
| 2019/0037482 A1 | 1/2019 | Damnjanovic et al. |
| 2019/0037525 A1 | 1/2019 | Liu et al. |
| 2019/0037603 A1 | 1/2019 | Damnjanovic et al. |
| 2019/0045509 A1 | 2/2019 | Mallik |
| 2019/0053269 A1 | 2/2019 | Lei et al. |
| 2019/0059001 A1 | 2/2019 | Yerramalli et al. |
| 2019/0059102 A1 | 2/2019 | Yerramalli et al. |
| 2019/0069325 A1 | 2/2019 | Yerramalli et al. |
| 2019/0075591 A1 | 3/2019 | Sun et al. |
| 2019/0075597 A1 | 3/2019 | Yerramalli et al. |
| 2019/0081768 A1 | 3/2019 | Zhang et al. |
| 2019/0082333 A1 | 3/2019 | Malik et al. |
| 2019/0090178 A1 | 3/2019 | Liu et al. |
| 2019/0090256 A1 | 3/2019 | Liu et al. |
| 2019/0090273 A1 | 3/2019 | Yoo et al. |
| 2019/0098656 A1 | 3/2019 | Chendamarai Kannan et al. |
| 2019/0098663 A1 | 3/2019 | Zhang et al. |
| 2019/0104416 A1 | 4/2019 | Yerramalli et al. |
| 2019/0104514 A1 | 4/2019 | Chendamarai Kannan et al. |
| 2019/0104542 A1 | 4/2019 | Chendamarai Kannan et al. |
| 2019/0104546 A1 | 4/2019 | Chendamarai Kannan et al. |
| 2019/0104547 A1 | 4/2019 | Xue et al. |
| 2019/0110208 A1 | 4/2019 | Xue et al. |
| 2019/0110254 A1 | 4/2019 | Yerramalli et al. |
| 2019/0110302 A1 | 4/2019 | Zhang et al. |
| 2019/0110317 A1 | 4/2019 | Zhang et al. |
| 2019/0116585 A1 | 4/2019 | Chakraborty et al. |
| 2019/0116599 A1 | 4/2019 | Xue et al. |
| 2019/0124518 A1 | 4/2019 | Zhang et al. |
| 2019/0124595 A1 | 4/2019 | Lei et al. |
| 2019/0124613 A1 | 4/2019 | Liu et al. |
| 2019/0124663 A1 | 4/2019 | Liu et al. |
| 2019/0124694 A1 | 4/2019 | Chendamarai Kannan et al. |
| 2019/0132817 A1 | 5/2019 | Liu et al. |
| 2019/0141707 A1 | 5/2019 | Yerramalli et al. |
| 2019/0141723 A1 | 5/2019 | Zhang et al. |
| 2019/0141734 A1 | 5/2019 | Lei et al. |
| 2019/0141744 A1 | 5/2019 | Naghshvar et al. |
| 2019/0141783 A1 | 5/2019 | Malik et al. |
| 2019/0149190 A1 | 5/2019 | Liu et al. |
| 2019/0150088 A1 | 5/2019 | Sun et al. |
| 2019/0150198 A1 | 5/2019 | Sun et al. |
| 2019/0158333 A1 | 5/2019 | Zhang et al. |
| 2019/0159280 A1 | 5/2019 | Chakraborty et al. |
| 2019/0166621 A1 | 5/2019 | Yerramalli et al. |
| 2019/0173521 A1 | 6/2019 | Liu et al. |
| 2019/0173611 A1 | 6/2019 | Liu et al. |
| 2019/0174532 A1 | 6/2019 | Damnjanovic et al. |
| 2019/0174542 A1 | 6/2019 | Lei et al. |
| 2019/0181995 A1 | 6/2019 | Liu et al. |
| 2019/0182826 A1 | 6/2019 | Yerramalli et al. |
| 2019/0182845 A1 | 6/2019 | Xue et al. |
| 2019/0190668 A1 | 6/2019 | Lei et al. |
| 2019/0199786 A1 | 6/2019 | Mallik |
| 2019/0200385 A1 | 6/2019 | Xue et al. |
| 2019/0223215 A1 | 7/2019 | Tian et al. |
| 2019/0229788 A1 | 7/2019 | Zhang et al. |
| 2019/0238177 A1 | 8/2019 | Liu et al. |
| 2019/0238219 A1 | 8/2019 | Liu et al. |
| 2019/0238284 A1 | 8/2019 | Liu et al. |
| 2019/0239202 A1 | 8/2019 | Bhattad et al. |
| 2019/0246410 A1 | 8/2019 | Zhang et al. |
| 2019/0246425 A1 | 8/2019 | Zhang et al. |
| 2019/0253219 A1 | 8/2019 | Fan et al. |
| 2019/0261354 A1 | 8/2019 | Fakoorian et al. |
| 2019/0268907 A1 | 8/2019 | Bhattad et al. |
| 2019/0268933 A1 | 8/2019 | Sun et al. |
| 2019/0274162 A1 | 9/2019 | Zhang et al. |
| 2019/0280836 A1 | 9/2019 | Bhattad et al. |
| 2019/0288761 A1 | 9/2019 | Mallik |
| 2019/0305834 A1 | 10/2019 | Fakoorian et al. |
| 2019/0306878 A1 | 10/2019 | Zhang et al. |
| 2019/0306881 A1 | 10/2019 | Fakoorian et al. |
| 2019/0312671 A1 | 10/2019 | Lin et al. |
| 2019/0312763 A1 | 10/2019 | Lei et al. |
| 2019/0313260 A1 | 10/2019 | Zhang et al. |
| 2019/0313419 A1 | 10/2019 | Fakoorian et al. |
| 2019/0319767 A1 | 10/2019 | Sun et al. |
| 2019/0320420 A1 | 10/2019 | Zhang et al. |
| 2019/0320424 A1 | 10/2019 | Yerramalli et al. |
| 2019/0320452 A1 | 10/2019 | Zhang et al. |
| 2019/0326976 A1* | 10/2019 | Hu .................. H04W 72/0493 |
| 2019/0327047 A1 | 10/2019 | Liu et al. |
| 2019/0334577 A1 | 10/2019 | Damnjanovic et al. |
| 2019/0334666 A1 | 10/2019 | Damnjanovic et al. |
| 2019/0335337 A1 | 10/2019 | Damnjanovic et al. |
| 2019/0335456 A1 | 10/2019 | Yerramalli et al. |
| 2019/0335500 A1 | 10/2019 | Zhang et al. |
| 2019/0335504 A1 | 10/2019 | Chakraborty et al. |
| 2019/0342035 A1 | 11/2019 | Zhang et al. |
| 2019/0342045 A1 | 11/2019 | Radulescu et al. |
| 2019/0349969 A1 | 11/2019 | Chakraborty et al. |
| 2019/0349992 A1 | 11/2019 | Zhang et al. |
| 2019/0349998 A1 | 11/2019 | Bhattad et al. |
| 2019/0357252 A1 | 11/2019 | Sun et al. |
| 2019/0357255 A1 | 11/2019 | Sun et al. |
| 2019/0363773 A1 | 11/2019 | Yerramalli et al. |

(56) References Cited

U.S. PATENT DOCUMENTS

| | | |
|---|---|---|
| 2019/0364468 A1 | 11/2019 | Yerramalli et al. |
| 2019/0364579 A1 | 11/2019 | Zhang et al. |
| 2019/0373571 A1 | 12/2019 | Damnjanovic et al. |
| 2019/0373640 A1 | 12/2019 | Sun et al. |
| 2019/0379561 A1 | 12/2019 | Zhang et al. |
| 2019/0380147 A1 | 12/2019 | Zhang et al. |
| 2019/0386737 A1 | 12/2019 | Liu et al. |
| 2019/0387532 A1 | 12/2019 | Liu et al. |
| 2019/0394790 A1 | 12/2019 | Damnjanovic et al. |
| 2020/0008107 A1 | 1/2020 | Zhang et al. |
| 2020/0008108 A1 | 1/2020 | Yoo et al. |
| 2020/0008131 A1 | 1/2020 | Chakraborty et al. |
| 2020/0015268 A1 | 1/2020 | Zhang et al. |
| 2020/0021423 A1 | 1/2020 | Liu et al. |
| 2020/0022029 A1 | 1/2020 | Sadek et al. |
| 2020/0029221 A1 | 1/2020 | Xue et al. |
| 2020/0037336 A1 | 1/2020 | Sun et al. |
| 2020/0045556 A1 | 2/2020 | Xue et al. |
| 2020/0045623 A1 | 2/2020 | Damnjanovic et al. |
| 2020/0045744 A1 | 2/2020 | Sun et al. |
| 2020/0052870 A1 | 2/2020 | Yerramalli et al. |
| 2020/0053599 A1 | 2/2020 | Damnjanovic et al. |
| 2020/0053739 A1 | 2/2020 | Xue et al. |
| 2020/0059346 A1 | 2/2020 | Yoo et al. |
| 2020/0059854 A1 | 2/2020 | Li et al. |
| 2020/0067639 A1 | 2/2020 | Lin et al. |
| 2020/0067748 A1 | 2/2020 | Zhang et al. |
| 2020/0068435 A1 | 2/2020 | Zhang et al. |
| 2020/0077394 A1 | 3/2020 | Damnjanovic et al. |
| 2020/0077439 A1 | 3/2020 | Sun et al. |
| 2020/0084759 A1 | 3/2020 | Liu et al. |
| 2020/0099436 A1 | 3/2020 | Malik et al. |
| 2020/0100116 A1 | 3/2020 | Chakraborty et al. |
| 2020/0100247 A1 | 3/2020 | Zhang et al. |
| 2020/0100250 A1 | 3/2020 | Zhang et al. |
| 2020/0107335 A1 | 4/2020 | Xue et al. |
| 2020/0107360 A1 | 4/2020 | Xue et al. |
| 2020/0107364 A1 | 4/2020 | Xue et al. |
| 2021/0243226 A1 | 8/2021 | El Gamal et al. |
| 2021/0328920 A1 | 10/2021 | Kadous et al. |
| 2021/0329486 A1 | 10/2021 | Kadous et al. |
| 2021/0376973 A1 | 12/2021 | Mallik et al. |

OTHER PUBLICATIONS

Sigurd Schelstraete, 'MU BFee Interference channel feedback', IEEE 802.11-15/1087, Sep. 13, 2015.
Nitsche et al., IEEE 802.11ad: Directional 60 GHz Communication for Multi-Gbps Wi-Fi, Dec. 2014.

* cited by examiner

INTERFERENCE-AWARE BEAMFORMING

CROSS-REFERENCE TO RELATED APPLICATIONS

This application claims the benefit of priority to U.S. Patent Provisional Application No. 63/030,181, entitled "INTERFERENCE-AWARE BEAMFORMING" and filed on May 26, 2020, which is hereby incorporated by reference herein in its entirety. Any and all applications for which a foreign or domestic priority claim is identified in the Application Data Sheet as filed with the present application, are hereby incorporated by reference under 37 CFR 1.57.

BACKGROUND

Technical Field

Embodiments of this disclosure relate to wireless communication systems, such as multiple-input multiple output wireless communication systems.

Description of Related Technology

The types of modern computing devices continues to increase along with the differing and dynamic needs of each device. The wireless communication systems providing services to such devices are facing increasing constraints on resources and demands for quality and quantities of service. Accordingly, improvements in providing wireless communication services, such as in a multiple-input multiple-output system, are desired.

SUMMARY

One aspect of the disclosure provides an access point controller comprising a network communication device. The access point controller further comprises a processor in communication with the network communication device, where computer-executable instructions, when executed by the processor, cause the access point controller to: obtain a first plurality of candidate downlink beams from a first access point; obtain a second plurality of candidate downlink beams from a second access point; select a first downlink beam from the first plurality of candidate downlink beams and a second downlink beam from the second plurality of candidate downlink beams based on a channel quality of the first plurality of candidate downlink beams, a channel quality of the second plurality of candidate downlink beams, a priority of a first packet intended for a first station, and a priority of a second packet intended for a second station; instruct the first access point to serve the first station using the first downlink beam; and instruct the second access point to serve the second station using the second downlink beam.

The access point controller of the preceding paragraph can include any sub-combination of the following features: where the computer-executable instructions, when executed, further cause the access point controller to instruct the first access point to serve the first station using the first downlink beam over a first frequency channel; where the computer-executable instructions, when executed, further cause the access point controller to: select a third downlink beam from the first plurality of candidate downlink beams and a fourth downlink beam from the second plurality of candidate downlink beams based on the channel quality of the first plurality of candidate downlink beams, the channel quality of the second plurality of candidate downlink beams, the priority of the first packet intended for the first station, and the priority of the second packet intended for the second station, instruct a third access point to serve the first station using the third downlink beam over a second frequency channel different than the first frequency channel, and instruct a fourth access point to serve the second station using the fourth downlink beam over the second frequency channel; where the first downlink beam and the third downlink beam are spatially separated by at least a threshold distance; where the computer-executable instructions, when executed, further cause the access point controller to select the first station and the second station from a plurality of stations based on spatial positions of the first and second stations; where the first and second stations are spatially separated by at least a threshold distance; where the computer-executable instructions, when executed, further cause the access point controller to: generate a first function based on a first product of the priority of the first packet and a channel quality of a third downlink beam and a second product of the priority of the second packet and a channel quality of a fourth downlink beam, generate a second function based on a third product of the priority of the first packet and a channel quality of the first downlink beam and a fourth product of the priority of the second packet and a channel quality of the second downlink beam, determine that a sum of the third and fourth products is greater than a sum of the first and second products, and select the first downlink beam and the second downlink beam based on the sum of the third and fourth products being greater than the sum of the first and second products; where the first downlink beam is selected as a candidate by the first access point, and where the third downlink beam is selected as a candidate by a third access point; where the computer-executable instructions, when executed, further cause the access point controller to instruct the first access point to serve the first station using the first downlink beam instead of the third access point based on the sum of the third and fourth products being greater than the sum of the first and second products; and where the first access point selects the first plurality of candidate downlink beams by initiating a beam training procedure.

Another aspect of the disclosure provides a computer-implemented method comprising: obtaining a first plurality of candidate downlink beams from a first access point; obtaining a second plurality of candidate downlink beams from a second access point; selecting a first downlink beam from the first plurality of candidate downlink beams and a second downlink beam from the second plurality of candidate downlink beams based on a channel quality of the first plurality of candidate downlink beams, a channel quality of the second plurality of candidate downlink beams, a priority of a first packet intended for a first station, and a priority of a second packet intended for a second station; instructing the first access point to serve the first station using the first downlink beam; and instructing the second access point to serve the second station using the second downlink beam.

The computer-implemented method of the preceding paragraph can include any sub-combination of the following features: where instructing the first access point to serve the first station using the first downlink beam further comprises instructing the first access point to serve the first station using the first downlink beam over a first frequency channel; where the computer-implemented method further comprises: selecting a third downlink beam from the first plurality of candidate downlink beams and a fourth downlink beam from the second plurality of candidate downlink beams based on the channel quality of the first plurality of candidate downlink beams, the channel quality of the second plurality of candidate downlink beams, the priority of the first packet intended for the first station, and the priority of the second packet intended for the second station, instructing a third access point to serve the first station using the third downlink beam over a second frequency channel different than the first frequency channel, and instructing a fourth access point to serve the second station using the fourth downlink beam over the second frequency channel; where the first downlink beam and the third downlink beam are spatially separated by at least a threshold distance; where the computer-implemented method further comprises selecting the first station and the second station from a plurality of stations based on spatial positions of the first and second stations; where the first and second stations are spatially separated by at least a threshold distance; where selecting a first downlink beam from the first plurality of candidate downlink beams and a second downlink beam from the second plurality of candidate downlink beams further comprises: generating a first function based on a first product of the priority of the first packet and a channel quality of a third downlink beam and a second product of the priority of the second packet and a channel quality of a fourth downlink beam, generating a second function based on a third product of the priority of the first packet and a channel quality of the first downlink beam and a fourth product of the priority of the second packet and a channel quality of the second downlink beam, determining that a sum of the third and fourth products is greater than a sum of the first and second products, and selecting the first downlink beam and the second downlink beam based on the sum of the third and fourth products being greater than the sum of the first and second products; where the first downlink beam is selected as a candidate by the first access point, and where the third downlink beam is selected as a candidate by a third access point; where instructing the first access point to serve the first station further comprises instructing the first access point to serve the first station using the first downlink beam instead of the third access point based on the sum of the third and fourth products being greater than the sum of the first and second products; and where the first access point selects the first plurality of candidate downlink beams by initiating a beam training procedure.

Another aspect of the disclosure provides non-transitory, computer-readable storage media comprising computer-executable instructions, where the computer-executable instructions, when executed by an access point controller, cause the access point controller to: obtain a first plurality of candidate downlink beams from a first access point; obtain a second plurality of candidate downlink beams from a second access point; select a first downlink beam from the first plurality of candidate downlink beams and a second downlink beam from the second plurality of candidate downlink beams based on a channel quality of the first plurality of candidate downlink beams, a channel quality of the second plurality of candidate downlink beams, a priority of a first packet intended for a first station, and a priority of a second packet intended for a second station; instruct the first access point to serve the first station using the first downlink beam; and instruct the second access point to serve the second station using the second downlink beam.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
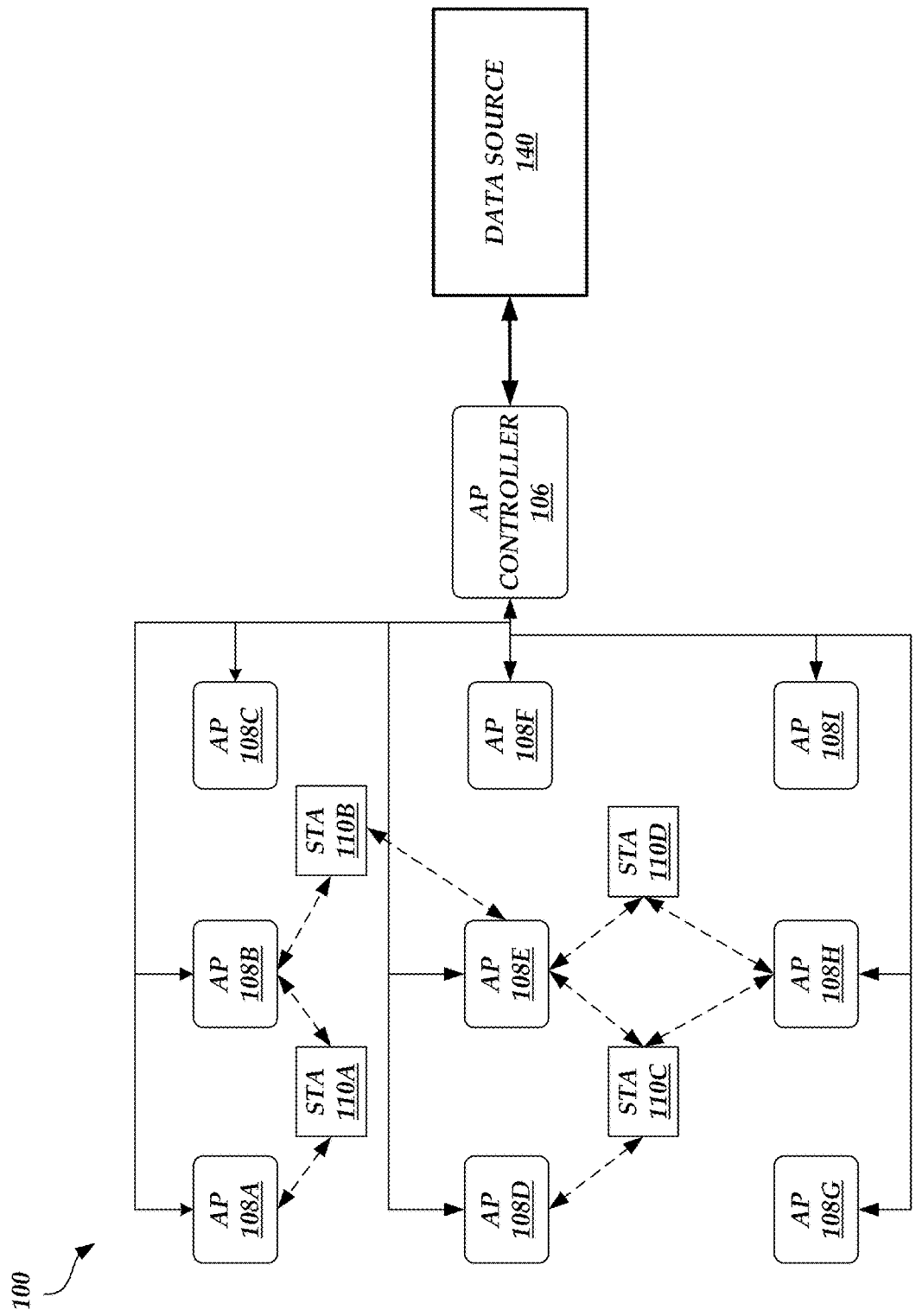
FIG. 1A is a diagram of an interference-aware beamforming environment in which multiple STAs and APs can communicate with each other according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

As wireless networks are increasingly used to run services sensitive to reliability and/or latency issues (e.g., media streaming, video chat, virtual reality, augmented reality, etc.), any situations that negatively affect reliability and/or latency can be problematic. For example, obstructions and/or interference can prevent a station (STA) from receiving a transmission from an access point (AP), and vice-versa. Typically, a STA or AP may retransmit a packet if an initial transmission fails (e.g., if the AP or STA for which the packet is intended does not receive the packet, as indicated by the failure of the AP or STA to send an acknowledgement message acknowledging receipt of the packet). However, if the initial transmission failed because of an obstruction (e.g., by an object, such as a wall, a human, furniture, etc.) and/or interference (e.g., from another transmitting device, such as an AP or STA), the obstruction and/or interference is likely to still be present when the STA or AP attempts the retransmission (e.g., given that retransmissions generally occur within 1 ms, 10 ms, 100 ms, etc. of the initial transmission). Thus, obstructions and/or interference can reduce the reliability of the wireless network.

To increase the reliability and reduce the latency of the wireless network, described herein is an interference-aware beamforming environment in which an AP controller can determine, for each STA, one or more beams of one or more APs to serve the respective STA. For example, an AP can request one or more STAs provide one or more uplink pilot signals (e.g., via a beam refinement procedure request) during different time slots. The STA(s) can each transmit one or more uplink pilot signals during the assigned time slot as a result, where the transmitted uplink pilot signal(s) may be the same uplink pilot signal(s) transmitted multiple times during the assigned time slot or different uplink pilot signal(s) transmitted during the assigned time slot. The AP can receive the uplink pilot signal(s) and determine, for each STA, the uplink beam quality of each of the uplink pilot signal(s) received from the respective STA. The AP can then use reciprocity to determine, for each STA, the downlink beam quality for various downlink beams. For example, the AP can determine, for a beam, that the downlink beam quality is the same as the uplink beam quality. The AP can then determine that the best downlink beam will be the uplink beam with the highest beam quality, the second-best downlink beam will be the uplink beam with the second-highest beam quality, and so on. The AP can use the determined downlink beam quality to identify the best beam with which to serve the respective STA.

Other APs in the interference-aware beamforming environment can perform the same operations to determine the best downlink beam to serve one or more STAs, and each of the APs can provide an indication of the downlink beams selected to serve one or more STAs to an AP controller. The APs may have selected the downlink beams without taking into account interference that may occur with other transmissions from other APs and/or STAs. Thus, the AP controller can perform an arbitration operation, determining which downlink beam(s) an AP should use to serve a STA based on the downlink beams originally selected by the APs. For example, the AP controller can select downlink beams for the APs to serve the STAs that minimizes interference and that maximizes a weighted sum-rate based on packet priority and beam quality. The AP controller can then inform each of the APs of the downlink beam(s) selected to serve each STA from the respective AP. The APs can then each determine a rate to serve some or all of the STAs.

Thus, the AP controller can both minimize interference and increase reliability by determining which downlink beams an AP should use to serve a STA. In fact, the AP controller can further reduce latency in the wireless network by determining the downlink beams based at least in part on packet urgency, which may result in data packets being transmitted to destination STAs in a more timely manner.

In an embodiment, the interference-aware beamforming environment described herein is designed to operate at higher frequencies, such as at millimeter wave (mmW) frequencies, such as between 24 GHz to 300 GHz. In general, mmW frequencies can encompass at least some frequency ranges between 2 GHz to 3 GHz, at least some frequency ranges in the Super high frequency (SHF) bands (e.g., 3 GHz to 30 GHz), and/or at least some frequency ranges in the Extremely High Frequency (EHF) bands (e.g., 30 GHz to 300 GHz). The techniques described herein can be applied to networks operating at any suitable range of frequencies. In addition, the techniques described herein can be used for a variety of use cases, such as media streaming, video chat, virtual reality, augmented reality, etc.

Interference-Aware Beamforming

FIG. 1A is a diagram of an interference-aware beamforming environment 100 in which multiple STAs 110A-D and APs 108A-I can communicate with each other according to an embodiment. As illustrated in FIG. 1A, the multipoint environment 100 includes a plurality of APs 108A-I, a plurality of STAs 110A-D, an AP controller 106, and a data source 140. In an embodiment, data packets can be wirelessly transmitted from the data source 140 to the plurality of STAs 110A-D via one or more of the APs 108A-I. Similarly, data packets can be transmitted from the plurality of STAs 110A-D to one or more APs 108A-I.

As described herein, a STA 110A-D can communicate with multiple APs 108A-I and an AP 108A-I can communicate with multiple STAs 110A-D in a single wireless stack (e.g., a single IEEE 820.11 protocol stack). For example, a STA 110A-D can authenticate simultaneously with multiple APs 108A-I and decode any data packet that includes in a header or preamble a destination address that matches an address of the STA 110A-D, irrespective of the source address included in the header or preamble of the data packet. Similarly, an AP 108A-I can decode any data packet that includes in a header or preamble a destination address that matches an address of the AP 108A-I or that matches a wildcard address associated with the AP 108A-I, irrespective of the source address included in the header of the data packet. For example, a wildcard address may be an address associated with multiple APs 108A-I rather than a unique address associated with just one AP 108A-I.

For the purposes of illustration and not meant to be limiting, STA 110A communicates with APs 108A and 108B, STA 110B communicates with APs 108B and 108E, STA 110C communicates with APs 108D, 108E, and 108H, and STA 110D communicates with APs 108E and 108H. The STAs 110A-D and APs 108A-I, however, can communicate with other APs 108A-I and STAs 110A-D. Thus, unlike typical wireless network environments in which a BSS includes one AP assigned to one or more STAs, the multipoint environment 100 has no pre-defined AP 108A-I to which a STA 110A-D is associated. Rather, the AP 108A-I transmitting a data packet to a particular STA 110A-D can change on a packet-by-packet basis. For example, the AP 108D can transmit a first data packet to the STA 110C at a first time, the AP 108E can transmit a second data packet to the STA 110C at a second time, the AP 108H can transmit a third data packet to the STA 110C at a third time, the AP 108D can transmit a fourth data packet to the STA 110C at a fourth time, and so on. In fact, the AP 108A-I that transmits a data packet to the STA 110A-D can change without the STA 110A-D changing BSSs to which the STA 110A-D is associated—the STA 110A-D may remain in the same basic service set (BSS) using the same, single wireless stack while the AP 108A-I that transmits data packets to the STA 110A-D changes. Similarly, there may be no pre-defined STA 110A-D to which an AP 108A-I is associated. Rather, the STA 110A-D transmitting a data packet to a particular AP 108A-I can change on a packet-by-packet basis.

The AP controller 106 can comprise one or more processors configured to execute instructions that, when executed, cause the AP controller 106 to perform the operations described herein as being performed by the AP controller 106. The AP controller 106 can further comprise a network communication device (e.g., an antenna, an ethernet port, a wireless network interface (e.g., mmW, Bluetooth, IEEE 802.11, etc.), a receiver, a transmitter, a transceiver, etc.) for communicating with APs 108A-I and/or the data source 140 and/or other hardware components (e.g., volatile memory, non-volatile memory, a motherboard, etc.). The AP controller 106 can be configured to select which downlink beams of the APs 108A-I should be used to transmit data packets to the STA 110A-D. For example, an AP 108A-I can initiate a beam training procedure (e.g., a beam refinement procedure receive procedure (BRP-Rx) of IEEE 802.11ad, the transmitter rx-beam selection and refinement procedure of new radio (NR) (e.g., technology operating in mmW frequencies), etc.) by requesting one or more STAs 110A-D provide one or more uplink pilot signals (e.g., BRPs, SRSs, etc.). In particular, the AP 108A-I can instruct each STA 110A-D for which a beam training procedure is initiated to transmit one or more uplink pilot signals during different time slots. Thus, the STAs 110A-D may not transmit the uplink pilot signals to the AP 108A-I at the same time, but rather sequentially at different times.

The STA(s) 110A-D can each transmit one or more uplink pilot signals to the AP 108A-I during the assigned time slot. For example, a STA 110A-D may have one or more transmit beams and an AP 108A-I may have one or more receive beams. The STA 110A-D can transmit an uplink pilot signal over a transmit beam multiple times during the assigned time slot, such as a number of times that matches the number of possible transmit beam-receive beam pairs. As an illustrative example, if a STA 110A-D has one transmit beam and an AP 108A-I has 16 receive beams, the STA 110A-D may transmit the uplink pilot signal 16 times during the assigned time slot. Each uplink pilot signal transmitted by the STA 110A-D may be transmitted during a different sub-time slot in the assigned time slot. Thus, the transmission of each uplink pilot signal by a STA 110A-D during an assigned time slot may not overlap in time. Rather, the STA 110A-D may transmit the uplink pilot signal multiple times in sequence during the assigned time slot. Because a STA 110A-D may transmit the uplink pilot signal multiple times during the assigned time slot (such as at least a number of times that equals the number of AP 108A-I receive beams), an AP 108A-I can determine the beam quality of a different receive beam each time the STA 110A-D transmits an uplink pilot signal during a sub-time slot. In other words, the AP 108A-I can determine the beam quality of a first receive beam during a first sub-time slot in which the STA 110A-D transmits the uplink pilot signal, can determine the beam quality of a second receive beam during a second sub-time slot in which the STA 110A-D transmits the uplink pilot signal, can determine the beam quality of a third receive beam during a third sub-time slot in which the STA 110A-D transmits the uplink pilot signal, and so on. Accordingly, the AP 108A-I may receive multiple uplink pilot signals from one STA 110A-D, and collectively the AP 108A-I may receive, for each STA 110A-D, multiple uplink pilot signals.

Using the received uplink pilot signal(s), the AP 108A-I can determine, for each STA 110A-D that transmitted at least one uplink pilot signal, the uplink beam quality (e.g., the uplink channel quality) of each transmit beam-receive beam pair over which an uplink pilot signal was received from the respective STA 110A-D. The AP 108A-I can then use reciprocity to determine, for each STA 110A-D, the downlink beam quality for various transmit beam-receive beam pairs. For example, the AP 108A-I can determine, for a transmit beam-receive beam pair, that the downlink beam quality for the AP 108A-I transmit beam-STA 110A-D receive beam pair corresponding to the respective transmit beam-receive beam pair is the same as the uplink beam quality for the respective transmit beam-receive beam pair (e.g., where an AP 108A-I receive beam may correspond to an AP 108A-I transmit beam if the transmit beam is used to transmit and the receive beam is used to receive packets over the same antenna or transmit-receive point (TRP), and where a STA 110A-D receive beam may correspond to a STA 110A-D transmit beam if the transmit beam is used to transmit and the receive beam is used to receive packets over the same antenna or TRP). The AP 108A-I can then identify, for each STA 110A-D, the AP 108A-I transmit beam-STA 110A-D receive beam pair with the highest downlink beam quality and select the transmit beam of the AP 108A-I as a candidate beam for serving the respective STA 110A-D. Thus, the AP 108A-I may identify, based on the uplink pilot signals transmitted by STA 110A, the STA 110A transmit beam-AP 108A-I receive beam pair with the highest uplink beam quality, determine that the downlink beam quality for the AP 108A-I transmit beam-STA 110A receive beam pair corresponding to the STA 110A transmit beam-AP 108A-I receive beam pair with the highest uplink beam quality is the same as the uplink beam quality, and select the AP 108A-I transmit beam of the AP 108A-I transmit beam-STA 110A receive beam pair corresponding to the STA 110A transmit beam-AP 108A-I receive beam with the highest uplink beam quality as a candidate beam for serving downlink transmissions to the STA 110A. The AP 108A-I can repeat this operation for some or all of the remaining STAs 110B-D.

Other APs 108A-I in the interference-aware beamforming environment 100 can perform the same operations to determine, for each STA 110A-D, the AP 108A-I transmit beam-STA 110A-D receive beam pair having the highest downlink channel quality and select that transmit beam as a candidate beam for serving downlink transmissions to the respective STA 110A-D. The APs 108A-I can then transmit an indication of the candidate beams selected to serve the STAs 110A-D to the AP controller 106. The APs 108A-D may have selected the candidate beams without taking into account interference that may occur with transmissions from other APs 108A-I and/or STAs 110A-D. Thus, the AP controller 106 can perform an arbitration operation to minimize interference.

For example, the AP controller 106 can initially identify a spatial location of each of the STAs 110A-D and partition the STAs 110A-D such that the STAs 110A-D in each partition are spatially separate (e.g., separated by at least a threshold distance). As an illustrative example, an AP 108A-I may have transmit and/or receive beams pointed in different directions. The AP 108A-I can measure the receive power over the different receive beams when a STA 110A-D transmits an uplink pilot signal and provide the measured receive power, an indication of the receive beams over which the receive power is measured, and/or the directions in which the receive beams point to the AP controller 106. The direction of a receive beam over which the strongest receive power is measured may be the direction in which a STA 110A-D is located. Thus, the AP controller 106 can use the information provided by the AP(s) 108A-I to identify the receive beam over which the strongest receive power is measured, and determine that the direction of the identified receive beam is the direction, and therefore spatial location, of the STA 110A-D that transmitted the uplink pilot signal. The AP controller 106 can repeat this operation for some or all of the STAs 110A-D to identifies the spatial locations of the STAs 110A-D. Alternatively, a AP 108A-I can determine the spatial location of a STA 110A-D using the techniques described above and provide an indication of the spatial location to the AP controller 106. The STAs 110A-D in a partition may therefore be spatially diverse and can be served simultaneously without or with minimal interference. Thus, the AP controller 106 or a scheduler may eventually schedule simultaneous and/or overlapping transmissions to STAs 110A-D in the same partition, and/or may schedule transmissions corresponding to different partitions sequentially (e.g., transmissions for STAs 110A-D in a first partition may be scheduled for a first time, transmissions for STAs 110A-D in a second partition may be scheduled for a second time following the first time, transmissions for STAs 110A-D in a third partition may be scheduled for a third time following the second time, and so on).

The AP controller 106 then determines, for each STA 110A-D in a partition, the top N (e.g., 1, 2, 3, 4, 5, 6, etc.) candidate beams selected for the respective STA 110A-D. For example, AP 108A may have selected a first candidate beam for a STA 110A-D in a partition, AP 108B may have selected a second candidate beam for the STA 110A-D, AP 108C may have selected a third candidate beam for the STA 110A-D, and so on. The AP controller 106 can rank the candidate beams selected for a respective STA 110A-D by the various APs 108A-I based on the channel quality (e.g., uplink beam quality, downlink beam quality, etc.) of the candidate beams.

Once the top N candidate beams are selected for each STA 110A-D in a partition, the AP controller 106 can maximize a weighted sum-rate to identify which of the top N candidate beams should be selected to serve each STA 110A-D in the partition. For example, each packet intended for a STA 110A-D may be associated with a priority. The priority may be represented as a time metric (e.g., a time deadline by which the packet should be delivered, the time that has elapsed since the packet was ready for transmission, etc.) or another metric indicating an order or urgency of the packet (e.g., a 1 to N ranking, with 1 or N being the highest priority). The AP controller 106 can use the priority as a weight and a beam or channel quality (e.g., signal-to-noise ratio (SNR), signal-to-interference-plus-noise ratio (SINR), etc.) of a candidate beam as a rate. The AP controller 106 can then generate one or more functions in which each function is a sum of one or more different products, where each product is a combination of a priority of a packet intended for a STA 110A-D in a partition and a channel or beam quality of one of the top N candidate beams for the STA 110A-D (e.g., each product is a weighted candidate beam quality metric). In particular, the following equation represents one possible function generated by the AP controller 106:

$$f_{1(x)} = w_1 B_1 + w_2 B_2 + w_3 B_3 + \ldots \quad (1)$$

where $w_1$ represents the priority of a packet intended for a first STA 110A-D in a partition, $B_1$ represents a beam or channel quality of one of the top N candidate beams for the first STA 110A-D, $w_2$ represents the priority of a packet intended for a second STA 110A-D in the partition, $B_2$ represents a beam or channel quality of one of the top N candidate beams for the second STA 110A-D, $w_3$ represents the priority of a packet intended for a third STA 110A-D in the partition, $B_3$ represents a beam or channel quality of one of the top N candidate beams for the third STA 110A-D, and so on.

Because the STAs 110A-D in a partition may be served simultaneously, overlapping in time, or at least during the same time slot, the candidate beam selected for each STA 110A-D in a given function is different. In addition, because there may be multiple candidate beams that could be selected to serve a given STA 110A-D, the AP controller 106 can generate multiple functions, where each function is directed to a different combination of STA 110A-D packet priority and STA 110A-D candidate beam quality products. In other words, each function may include one or more weighted candidate beam quality metrics. The values of the weights (e.g., STA 110A-D packet priority) may remain constant in each function. However, for a given STA 110A-D and function, the AP controller 106 may select a different candidate beam to apply to the weight for the respective STA 110A-D. The AP controller 106 may therefore generate a certain number of functions such that the functions collectively cover each possible combination of STA 110A-D packet priority and STA 110A-D candidate beam quality metric.

As an illustrative example, the AP controller 106 can select the top 3 candidate beams for each STA 110A-D, and three STAs 110A-C may be grouped into one partition. If 9 candidate beams are selected in total (e.g., each of the top 3 candidate beams for STA 110A are different than any of the top 3 candidate beams for STA 110B and are different than any of the top 3 candidate beams for STA 110C, and each of the top 3 candidate beams for STA 110B are different than any of the top 3 candidate beams for STA 110C), the AP controller 106 may generate one function in which the STA 110A priority or weight is applied to the beam or channel quality of the top candidate beam for STA 110A, the STA 110B priority or weight is applied to the beam or channel quality of the top candidate beam for STA 110B, and the STA 110C priority or weight is applied to the beam or channel quality of the top candidate beam for STA 110C, and the products are summed. The AP controller 106 may also generate a second function in which the STA 110A priority or weight is applied to the beam or channel quality of the second candidate beam for STA 110A, the STA 110B priority or weight is applied to the beam or channel quality of the top candidate beam for STA 110B, and the STA 110C priority or weight is applied to the beam or channel quality of the top candidate beam for STA 110C, and the products are summed. The AP controller 106 may also generate a third function in which the STA 110A priority or weight is applied to the beam or channel quality of the third candidate beam for STA 110A, the STA 110B priority or weight is applied to the beam or channel quality of the top candidate beam for STA 110B, and the STA 110C priority or weight is applied to the beam or channel quality of the top candidate beam for STA 110C, and the products are summed. The AP controller 106 may also generate a fourth function in which the STA 110A priority or weight is applied to the beam or channel quality of the top candidate beam for STA 110A, the STA 110B priority or weight is applied to the beam or channel quality of the second candidate beam for STA 110B, and the STA 110C priority or weight is applied to the beam or channel quality of the top candidate beam for STA 110C, and the products are summed. The AP controller 106 may continue generating different functions to cover some or all of the possible combinations of STA 110A-C weight and STA 110A-C candidate beam quality. Thus, in total, the AP controller 106 may generate 27 different functions.

On the other hand, if 5 candidate beams are selected in total (e.g., there is overlap in the top 3 candidate beams for the STAs 110A-C, where, for example, the same candidate beam is found in each of the top 3 candidate beams for the STAs 110A-C, the other 2 candidate beams for STA 110A are different than any of the top 3 candidate beams for STA 110B and are different than any of the top 3 candidate beams for STA 110C, and the top 3 candidate beams for STA 110B are the same as the top 3 candidate beams for STA 110C), the AP controller 106 may generate functions in which a different candidate beam is selected for each STA 110A-C in a given function. For example, the candidate beams may be referred to as candidate beams A, B, C, D, and E. The AP controller 106 can generate one function in which the STA 110A priority or weight is applied to the beam or channel quality of candidate beam A, the STA 110B priority or weight is applied to the beam or channel quality of candidate beam D, and the STA 110C priority or weight is applied to the beam or channel quality of candidate beam E, and the products are summed. The AP controller 106 may also generate a second function in which the STA 110A priority or weight is applied to the beam or channel quality of candidate beam A, the STA 110B priority or weight is applied to the beam or channel quality of candidate beam E, and the STA 110C priority or weight is applied to the beam or channel quality of candidate beam D, and the products are summed. The AP controller 106 may also generate a third function in which the STA 110A priority or weight is applied to the beam or channel quality of candidate beam B, the STA 110B priority or weight is applied to the beam or channel quality of candidate beam A, and the STA 110C priority or weight is applied to the beam or channel quality of candidate beam D, and the products are summed. The AP controller 106 may also generate a fourth function in which the STA 110A priority or weight is applied to the beam or channel quality of candidate beam B, the STA 110B priority or weight is applied to the beam or channel quality of candidate beam A, and the STA 110C priority or weight is applied to the beam or channel quality of candidate beam E, and the products are summed. The AP controller 106 may continue generating different functions to cover some or all of the possible combinations of STA 110A-C weight and STA 110A-C candidate beam quality with the condition that no two candidate beam quality metrics are repeated in a given function. Thus, in total, the AP controller 106 may generate 14 different functions.

Once the function(s) are generated, the AP controller 106 can identify the function that results in the highest sum (or second-highest sum, third-highest sum, etc.). The AP controller 106 can identify the combination of candidate beams included in the function that resulted in the highest sum (or second-highest sum, third-highest sum, etc.), and select these candidate beams as the beams to be used by one or more of the APs 108A-I to serve the STAs 110A-D in a partition. In particular, the AP controller 106 can identify using the function with the highest sum (or second-highest sum, third-highest sum, etc.), for some or all of the STAs 110A-D in a partition, which beam selected as a candidate by one of the APs 108A-I should be used to serve the respective STA 110A-D, with the AP 108A-I that selected the beam being assigned by the AP controller 106 as the AP 108A-I that will transmit downlink communications to the respective STA 110A-D using the selected beam. For example, if the function that resulted in the highest sum (or second-highest sum, third-highest sum, etc.) is formed using the beam or channel qualities of candidate beam A (which may be selected by AP 108B as a candidate to serve STA 110A), candidate beam B (which may be selected by AP 108C as a candidate to serve STA 110B), and candidate beam C (which may be selected by AP 108A as a candidate to serve STA 110C), then the AP controller 106 can instruct the AP 108B to serve the STA 110A using beam A (e.g., because the AP 108B selected beam A as a candidate beam to serve the STA 110A), instruct the AP 108C to serve the STA 110B using beam B (e.g., because the AP 108C selected beam B as a candidate beam to serve the STA 110B), and instruct the AP 108A to serve the STA 110C using beam C (e.g., because the AP 108A selected beam C as a candidate beam to serve the STA 110C).

The AP controller 106 can repeat these operations for each partition of STAs 110A-D, where the STAs 110A-D of each partition are scheduled to be served during different time slots. Thus, the AP controller 106 can select a subset of the candidate beams selected by the APs 108A-I for serving the STAs 110A-D, and inform the APs 108A-I of the beams (e.g., downlink beams) that are chosen to serve the STAs 110A-D.

Some or all of the APs 108A-I can then each determine a rate to serve some or all of the STAs 110A-D. For example, an AP 108A-I instructed to serve a STA 110A-D using a beam selected by the AP controller 106 can use a beam training procedure (e.g., a beam refinement procedure transmit procedure (BRP-Tx) of IEEE 802.11ad, the receiver tx-beam selection of NR, etc.), optionally with SINR feedback, to update the modulation and coding scheme (MCS) for the selected beam. In particular, the AP 108A-I can transmit one or more downlink pilot signals to the STA 110A-D, and use SINR feedback or other data included in an acknowledgment message provided by the STA 110A-D to update the MCS.

Optionally, prior to generating the function(s), the AP controller 106 can discard any candidate beams that have a beam or channel quality below a threshold quality level. For example, if a candidate beam selected by an AP 108A-I has a beam or channel quality below a threshold quality level, then the AP controller 106 may not consider this candidate beam when determining which beams should be used to serve the STAs 110A-D in a partition.

In further embodiments, the AP controller 106 can perform the operations described above to select a subset of the candidate beams for serving the STAs 110A-D, instructing the APs 108A-I that initially selected the candidate beams in the subset to transmit downlink communications over the selected beams using a first frequency channel. The AP controller 106 can then repeat the operations described above to select a second subset of the candidate beams for serving the STAs 110A-D, instructing the APs 108A-I that initially selected the candidate beams in the second subset to transmit downlink communications over the selected beams using a second frequency channel different than the first frequency channel. The AP controller 106 can repeat these operations zero or more times such that different subsets of candidate beams are selected, with each subset being associated with a different frequency channel over which downlink transmissions will be transmitted. The AP controller 106 may select the subsets in a manner such that a first beam selected to serve a STA 110A-D over a first frequency channel is spatially separated by at least a certain distance from a second beam selected to serve the same STA 110A-D over a second frequency channel, while maintaining a high SINR. For example, the two beams may be spatially separate if, for example, the two beams are transmitted by different APs 108A-I. In particular, the AP controller 106 may define a spatial separation between a first beam transmitted by a first AP 108A-I and a second beam transmitted by a second AP 108A-I as a function of a difference in angle of arrivals (AoAs) at the STA 110-D for downlink transmissions.

The AP controller 106 can route traffic to one or more APs 108A-I for transmission to one or more STAs 110A-D based on downlink and/or uplink quality measurements. A downlink (DL) transmission generally refers to a communication from a network system (e.g., an AP) to a user terminal (e.g., a STA). An uplink (UL) transmission generally refers to a communication from the user terminal to the network system.

In the interference-aware beamforming environment 100, base station functionality is subdivided between the data source 140, the AP controller 106, and/or multiple remote radio units (RRUs) (e.g., APs 108A-I). An RRU may include multiple antennas, and one or more of the antennas may serve as a TRP. The RRU and/or a TRP may be referred to as a serving node, a base station, or an access point. The data source 140 may be physically connected to the AP controller 106 and/or the RRUs, such as via an optical fiber connection. The data source 140 can store data to be transmitted to one or more STAs 110A-D and/or can store and/or process data received from one or more STAs 110A-D via one or more APs 108A-I. The data source 140 and/or the AP controller 106 may provide operational details to an RRU to control transmission and reception of signals from the RRU along with control data and payload data to transmit. The RRU may provide data to the network received from STAs 110A-D within a service area associated with the RRU. An RRU can provide service to devices (e.g., STAs 110A-D) within a service area. For example, wireless downlink transmission service may be provided by an RRU to the service area to communicate data to one or more devices within the service area.

The APs 108A-I may each have one or more transmit antennas that each support one or more digital basebands. In some embodiments, each AP 108A-I has the same number of transmit antennas. In other embodiments, some or all APs 108a-I have a different number of transmit antennas than other APs 108A-I. Thus, the APs 108A-I may collectively be capable of transmitting N spatial beams, where N is the product of the number of APs 108A-I in the multipoint environment 100 and the number of transmit antennas operated by a single AP 108A-I. Similarly, each AP 108A-I can have the same number or different number of receive antennas. The data source 140, the AP controller 106, and/or the APs 108A-I can be collectively referred to herein as a "network system."

Various standards and protocols may be included in the interference-aware beamforming environment 100 to wirelessly communicate data between a base station (e.g., an AP 108) and a wireless communication device (e.g., a STA 110). Some wireless devices may communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which may be known as WiMAX (Worldwide interoperability for Microwave Access), and the IEEE 802.11 standard, which may be known as Wi-Fi. In some systems, a radio access network (RAN) may include one or more base stations associated with one or more evolved NodeBs (also commonly denoted as enhanced NodeBs, eNodeBs, or eNBs), next generation NodeBs (gNBs), or any other suitable NodeBs (xNBs). In other embodiments, radio network controllers (RNCs) may be provided as the base stations. A base station provides a bridge between the wireless network and a core network such as the Internet. The base station may be included to facilitate exchange of data for the wireless communication devices of the wireless network.

The wireless communication device may be referred to as a station (STA) (e.g., for wireless communication devices that communicate using the IEEE 802.11 standard). The wireless communication device may also be referred to as a UE (e.g., for wireless communication devices that communicate in a RAN). The STA may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the STA may include a sensor or other networked device configured to collect data and wirelessly provide the data to a device (e.g., server) connected to a core network such as the Internet. Such devices may be referred to as Internet of Things devices (IoT devices).

The AP controller 106 can function as a router to route traffic between the data source 140 and the APs 108A-I. The AP controller 106 can implement a relatively small amount of buffering. This can contribute to the AP controller 106 routing data between the data source 140 and the APs 108A-I with low latency. The AP controller 106 can include any suitable hardware to implement the functionality described herein.

The APs 108A-I can be arranged as an array. All of the APs 108A-I can be connected to the AP controller 106. The APs 108A-I can be connected to the AP controller 106 via wired or wireless connections. Each AP 108A-I can buffer a relatively low amount of frames of data at a time. For example, an AP 108A can buffer 1 or 2 frames of data at a time in certain applications. The frames can be relatively big frames. For example, one frame can include 100 to 150 Internet protocol (IP) packets. The APs 108A-I are arranged to wirelessly communicate with STAs 110A-D. The APs 108A-I can communicate via any suitable wireless links, such as wireless local area network (WLAN) links. WLAN signals can have a shorter signal range than cellular signals. In some instances, the WLAN signals can have a range of about 300 feet or less. WLAN signals can have a range of about 150 feet or less in certain applications. An example of a WLAN link is a Wi-Fi link. The WLAN link can be implemented based on an IEEE 802.11 standard. The APs 108A-I are networking hardware devices that include any suitable physical hardware to implement the functionalities disclosed herein. Although APs are described with reference to certain embodiments for illustrative purposes, any suitable principles and advantages described with references to access points can be implemented with any other suitable serving nodes of a network system. Any suitable wireless link that meets latency and throughput specifications can be used. Wi-Fi links, millimeter wave (mmW) wireless area network (WAN) links, and fifth generation (5G) New Radio (NR) links in Frequency Range 2 (FR2) are examples of such suitable wireless links.

In some embodiments, the AP controller 106 is programmed to perform some or all of the functionality described herein as being performed by the AP controller 106. Similarly, the APs 108A-I, the STAs 110A-D, and/or the data source 140 may each be programmed to perform some or all of the functionality described herein as being performed by the respective component.

In other embodiments, some or all of the functionality of the AP controller 106 is performed instead by one or more of the APs 108A-I. For example, one AP 108A-I, several APs 108A-I in combination, or all of the APs 108A-I in combination can perform some or all of the functionality described herein as being performed by the AP controller 106. In such an embodiment, the AP controller 106 is optional and may not be present.

Figure 1B:
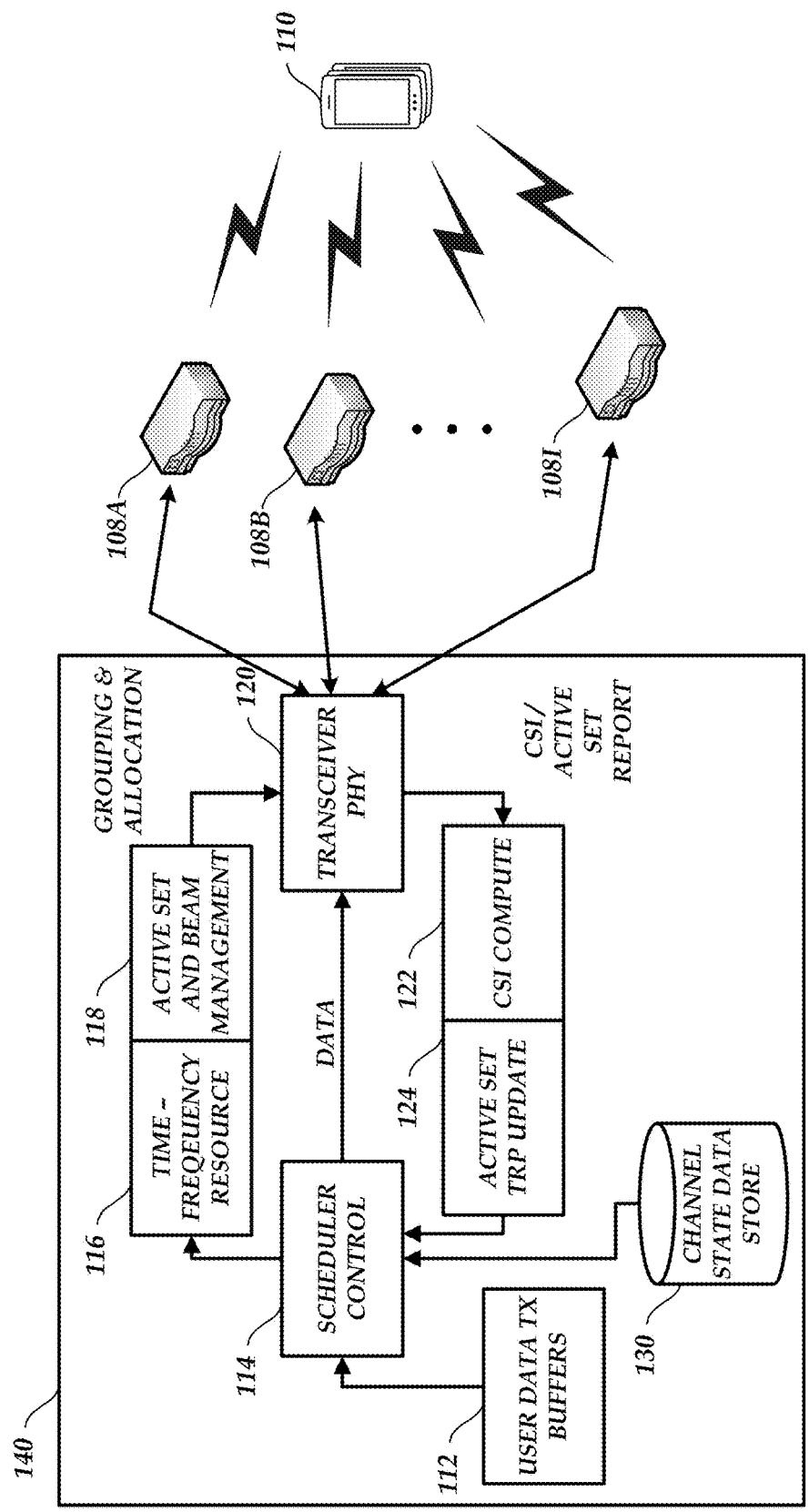
FIG. 1B is a schematic diagram illustrating a wireless network that includes the data source according to an embodiment.

FIG. 1B is a schematic diagram illustrating a wireless network 150 that includes the data source 140 according to an embodiment. In this embodiment, the APs 108A-I may operate as RRUs or serving nodes, and the data source 140 and/or the AP controller 106 (not shown) may select users (e.g., STAs 110, STA 110 receive antennas, etc.) to be served by one or more APs 108A-I over one or more time slots and/or over one or more spatial dimensions. In some embodiments, the data source 140 may be a baseband unit.

As illustrated in FIG. 1B, the data source 140 includes user data TX buffers 112, the scheduler control 114, a time/frequency resource allocation block 116, an active set and beam management block 118, a transceiver 120, a CSI computation block 122, an active set serving node update block 124, and the channel state data store 130. The data source 140 can include any suitable physical hardware to implement the illustrated blocks. For example, the data source 140 can include a processor and computer readable storage to implement any suitable blocks shown in FIG. 1B. The wireless network 150 also includes the APs 108A-I, one or more STAs 110, and/or the AP controller 106 (not shown). The wireless network 150 optionally includes other APs 108, not shown.

The data source 140 and/or the AP controller 106 includes a scheduler that selects users to serve over one or more spatial dimensions over one or more time slots, selects APs 108A-I to serve user data, and schedules user data for wireless transmission between the APs 108A-I and STAs 110 over various spatial dimensions (e.g., spatial beams, channels, etc.). The scheduler can schedule DL data traffic, UL data traffic, or both. The scheduler can schedule data from any suitable number of APs 108 to any suitable number of UEs 110. The scheduler can include the user data queue TX buffers 112, the scheduler control 114, the time/frequency resource allocation block 116, the active set and beam management block 118, the CSI computation block 122, the active set serving node update block 124, and/or the channel state data store 130.

The transceiver 120 can provide a STA report received from the STA 110 to the scheduler. For example, the STA report can include spatial beam link strengths, spatial beam link quality, and/or other CSI suitable for allowing the scheduler to schedule DL data transmissions and/or to schedule UL data transmissions. The CSI computation block 122 can compute CSI data from data in the STA report. The active set serving node update block 124 can determine an updated active set for one or more STAs 110 based on updated link strength information provided by the STA(s) 110 (e.g., provided by the STA(s) 110 in response to receiving DL data traffic). In some instances, the active set serving node update block 124 can determine an updated active set for a subset of one or more antennas of a STA 110. The active set serving node update block 124 can use any suitable metrics disclosed herein to update an active set associated with a STA 110.

The updated active set data is provided to the scheduler control 114. The user data queue TX buffers 112 can provide user data (e.g., DL user data) to the scheduler control 114. The scheduler control 114 provides user data to the transceiver 120 and also provides instructions to the time/frequency resource allocation block 116. The time/frequency resource allocation block 116 can schedule timing and frequency of DL and/or UL data transmission from and/or to APs 108 (e.g., generate scheduling data), which can be forwarded to the APs 108 via the transceiver 120 and/or the AP controller 106. This can avoid timing conflicts and conflicts in the frequency domain. The active set and beam management block 118 can select APs 108 and/or specific spatial beams offered by these APs 108 for providing wireless transmission services to STAs 110, and create corresponding active sets for the STAs 110. The active set and beam management block 118 can group DL data transmissions and manage beamforming from the APs 108 to the STAs 110. The transceiver 120 provides data for transmission by the APs 108 to STAs 110.

As illustrated in FIG. 1B, the scheduler can cause a network system of the wireless network 150 to wirelessly transmit first user data to a first STA 110 across one or more spatial beams or spatial dimensions, to transmit second user data to a second STA 110 across one or more spatial beams or spatial dimensions, and so on. The scheduler can cause the transmissions of the first user data, the second user data, etc. to occur simultaneously and/or at different times. Moreover, the scheduler can cause a network system of the wireless network 150 to wirelessly transmit user data to any suitable number of STAs 110 across one or more spatial beams or spatial dimensions served by one or more APs 108.

Figure 2A:
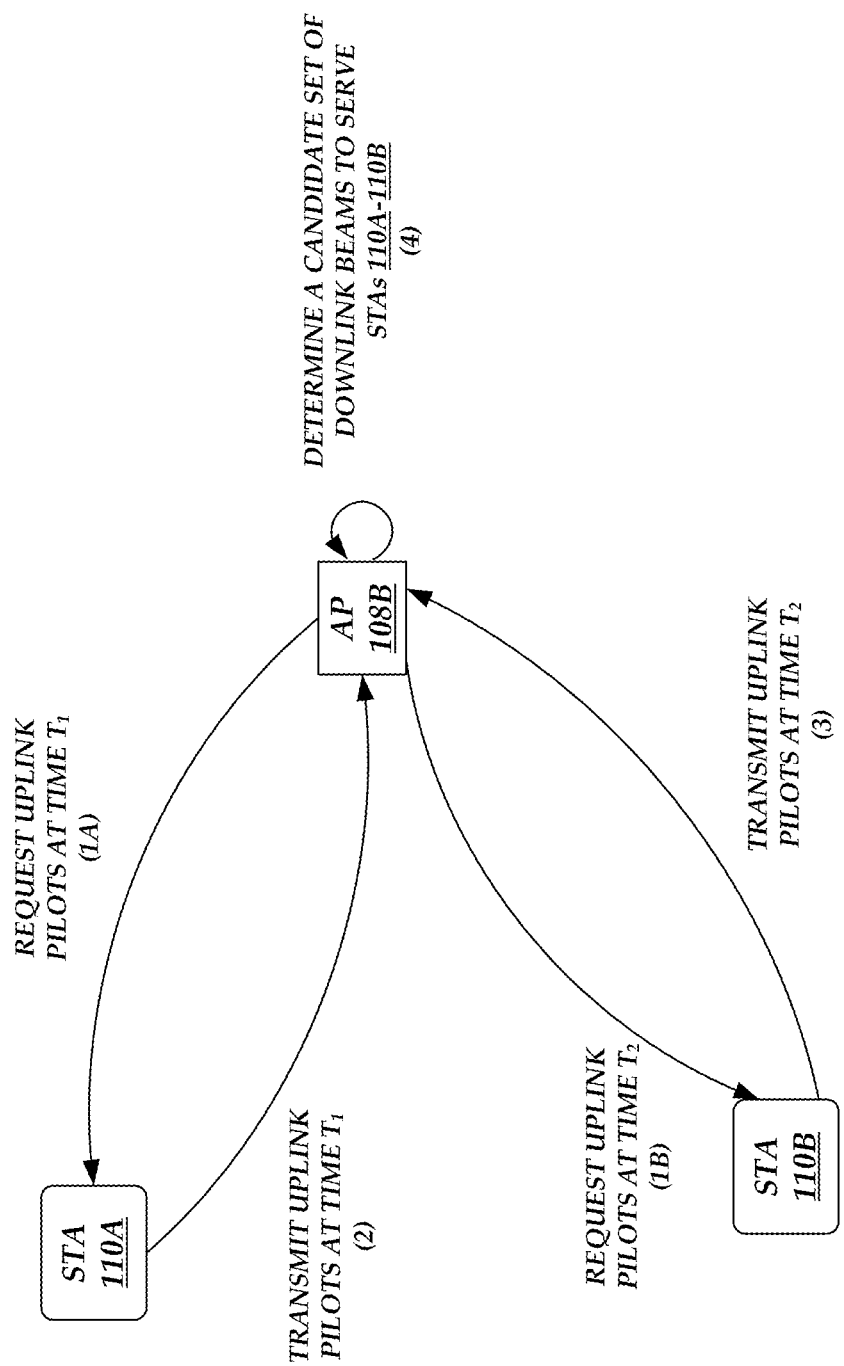
FIGS. 2A-2C are block diagrams of the interference-aware beamforming environment of FIG. 1A illustrating the operations performed by the components of the interference-aware beamforming environment to determine a set of downlink beams for serving STAs.
Figure 2B:
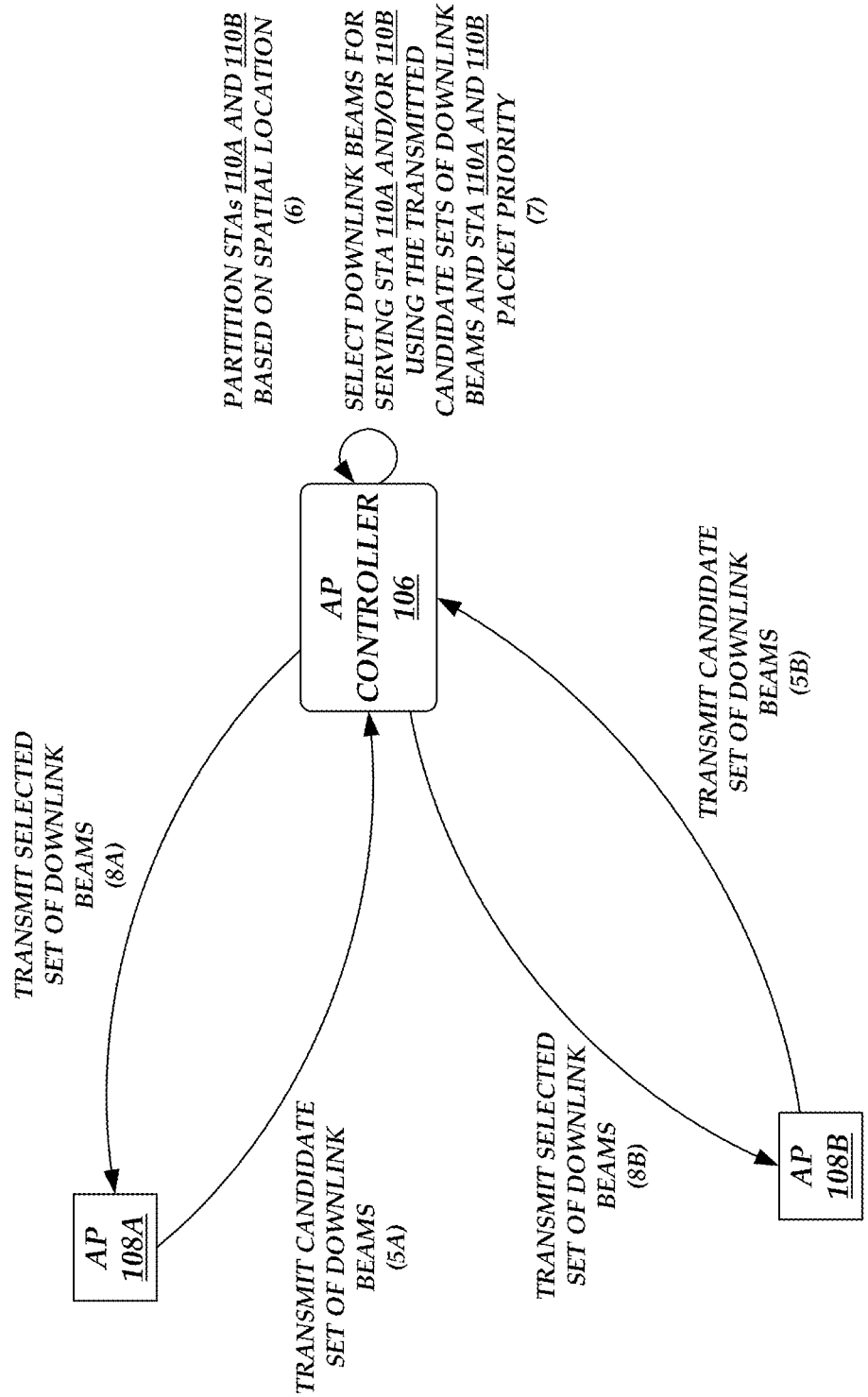
Figure 2C:
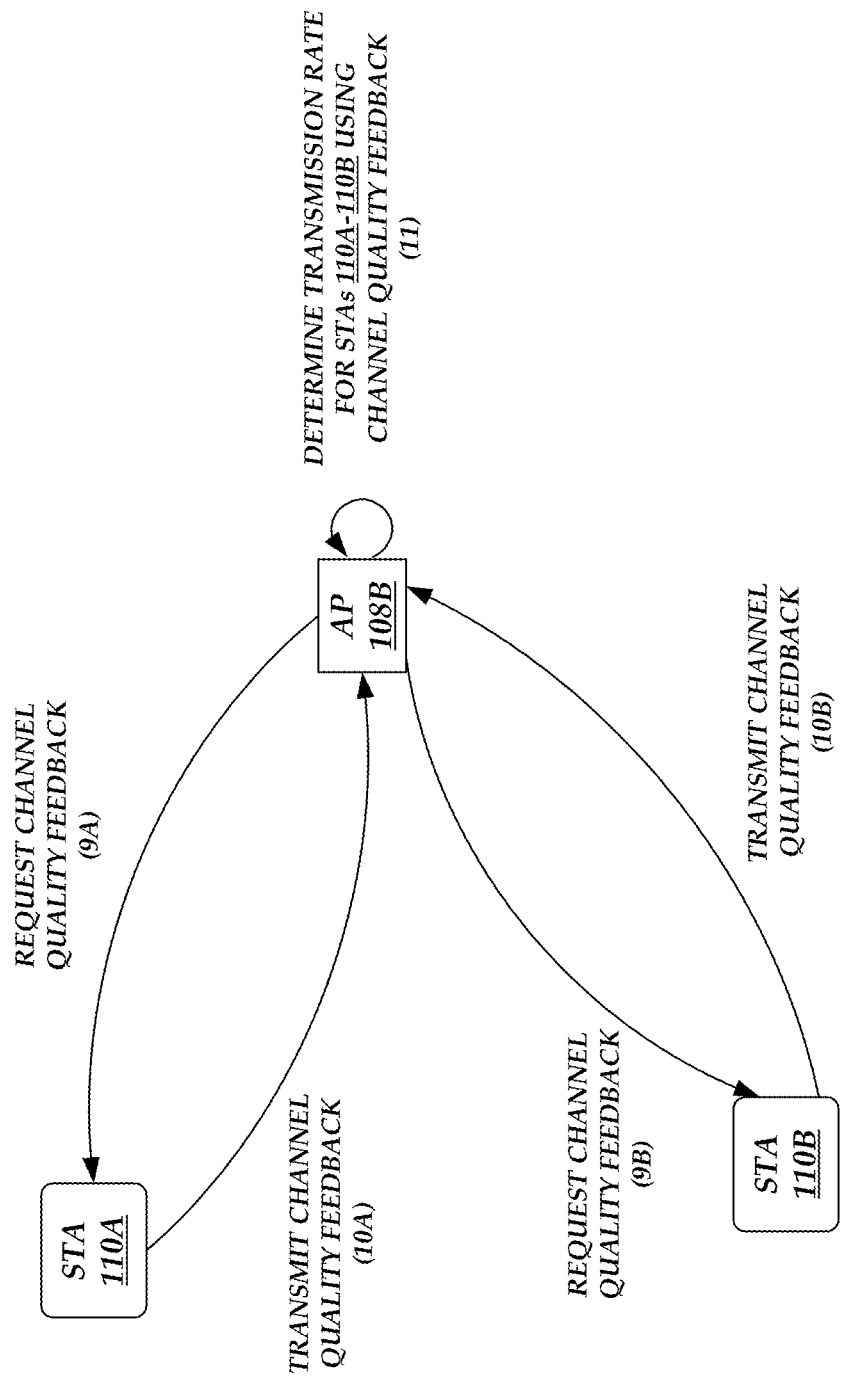

FIGS. 2A-2C are block diagrams of the interference-aware beamforming environment 100 of FIG. 1A illustrating the operations performed by the components of the interference-aware beamforming environment 100 to determine a set of downlink beams (e.g., a set of beams) for serving STAs 110A-B. While the operations depicted in FIGS. 2A-2C are performed by the APs 108A-B, this is not meant to be limiting. The operations depicted in FIGS. 2A-2C can be performed by any AP 108A-I.

As illustrated in FIG. 2A, the AP 108B requests uplink pilots from the STA 110A at time $T_1$ at (1A) and from the STA 110B at time $T_2$ at (1B). For example, the uplink pilots may be requested based on the AP 108B initiating a beam training procedure. As a result, the STA 110A can transmit one or more uplink pilots at time $T_1$ (or during a time range defined by $T_1$) at (2), and the STA 110B can transmit one or more uplink pilots at time $T_2$ (or during a time range defined by $T_2$) at (3). For example, the STAs 110A-B can each transmit the uplink pilot(s) multiple times sequentially during $T_1$ or $T_2$ or a time range defined by either time.

The AP 108B can receive the transmitted uplink pilot signal(s) and determine a candidate set of downlink beams to serve the STAs 110A-B at (4) using data derived from the transmitted uplink pilot signal(s). For example, the AP 108B can identify, for each received uplink pilot signal and for each STA 110A-B, the channel quality of a receive beam over which the respective uplink pilot signal was received. The transmit beam corresponding to the receive beam having the highest channel quality may be selected by the AP 108B as a candidate downlink beam to serve the STA 110A or 110B.

As illustrated in FIG. 2B, the AP 108A transmits a candidate set of downlink beams to the AP controller 106 at (5A). For example, the candidate set of downlink beams may be the candidate selected using the operations depicted in FIG. 2A. Similarly, the AP 108B transmits a candidate set of downlink beams to the AP controller 106 at (5B). The candidate set of downlink beams selected by the AP 108A may be the same, different, or a combination thereof than the candidate set of downlink beams selected by the AP 108B. In fact, none, some, or all of the candidate set of downlink beams selected by the AP 108A may interfere with the candidate set of downlink beams selected by the AP 108B if both APs 108A-B happened to be serving one or more STAs 110A-D simultaneously.

The AP controller 106 can partition the STAs 110A and 110B based on a spatial location of each of the STAs 110A and 110B at (6). For example, the STAs 110A and 110B may be spatially separate (e.g., located at least a certain distance apart, located in a different spatial plane, etc.), and therefore the AP controller 106 may include the STAs 110A and 110B in the same partition or group. As another example, the STAs 110A and 110B may not be spatially separate (e.g., located at most within a certain distance of each other, located in the same spatial plane, etc.), and therefore the AP controller 106 may include the STAs 110A and 110B in different partitions or groups. If the STAs 110A-B are included in the same partition or group, then the AP controller 106 may select downlink beams for serving both STAs 110A-B during the same time slot. Otherwise, if the STAs 110A-B are included in different partitions or groups, then the AP controller 106 may select downlink beams for serving the STAs 110A-B during different time slots.

The AP controller 106 can then select downlink beams for serving the STAs 110A and/or 110B using the transmitted candidate sets of downlink beams and STA 110A and 110B packet priority at (7). For example, the AP controller 106 can identify the beam or channel quality of the beams in the candidate set and define a function that maximizes a weighted sum of the beam or channel quality, where the weights are represented by the priority of various packets intended for the STAs 110A-B. The AP controller 106 can transmit an indication of the selected set of downlink beams to the AP 108A at (8A) and to the AP 108B at (8B). For example, the transmission may include an instruction for the AP 108A and/or 108B to transmit downlink communications to the STA 110A and/or 110B using a certain downlink beam initially selected as a candidate downlink beam by the AP 108A and/or 108B.

As illustrated in FIG. 2C, the AP 108B can initiate a beam training procedure, requesting channel quality feedback from the STA 110A at (9A) and from the STA 110B at (9B). For example, the request may be one or more downlink pilot signals. In response to the request, the STA 110A can transmit channel quality feedback to the AP 108B at (10A), and the STA 110B can transmit channel quality feedback to the AP 108B at (10B). For example, the channel quality feedback may be provided by the STAs 110A-B in an acknowledgment message or another message transmitted in response to a downlink pilot signal transmitted by the AP 108B.

The AP 108B can then determine a transmission rate for transmitting downlink transmissions to the STAs 110A-B using the channel quality feedback at (11). For example, the AP 108B can determine an MCS for downlink transmissions.

Figure 3:
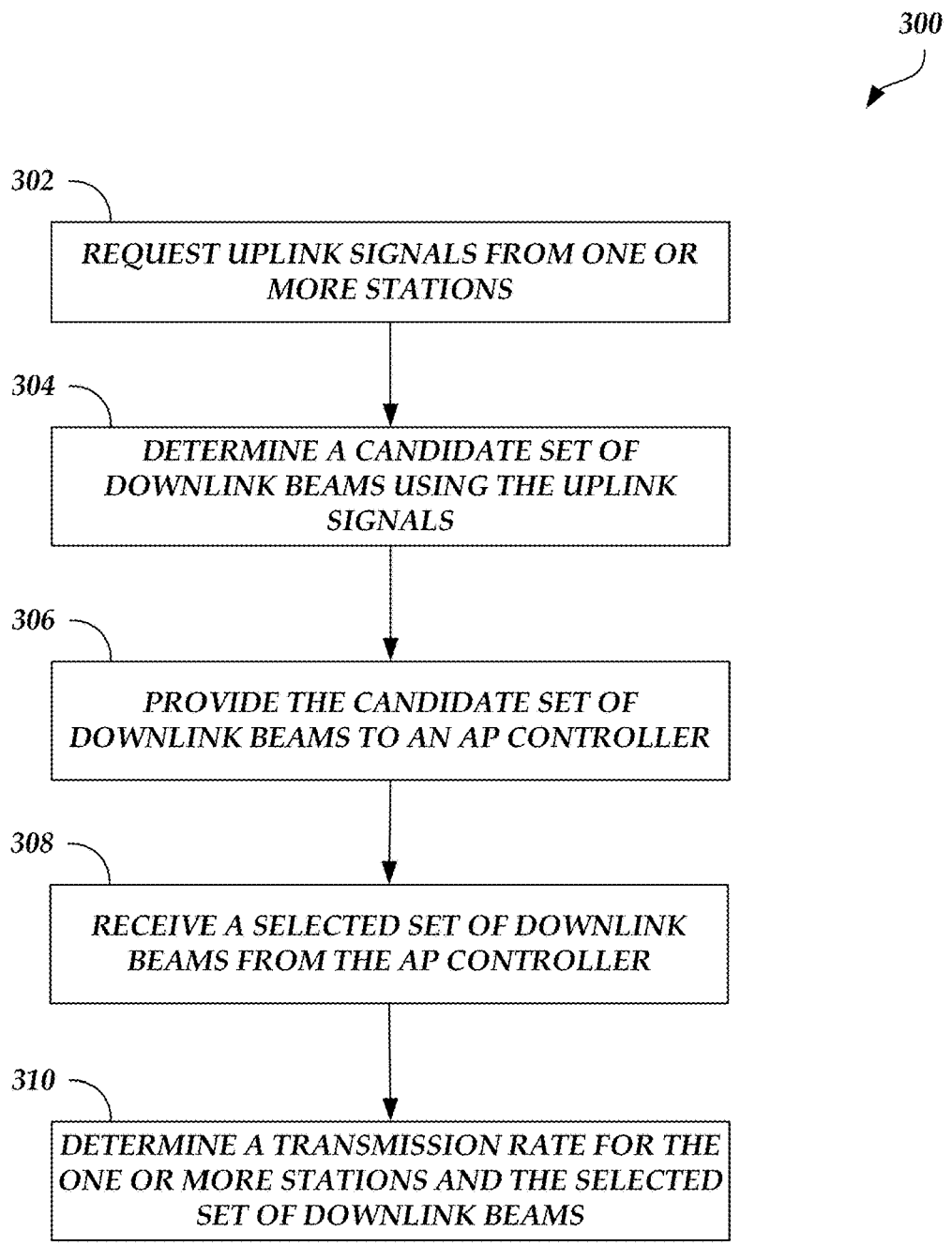
FIG. 3 is a flow diagram depicting a downlink beam selection routine illustratively implemented by an AP, according to one embodiment.

FIG. 3 is a flow diagram depicting a downlink beam selection routine 300 illustratively implemented by an AP, according to one embodiment. As an example, an AP 108A-I can be configured to execute the downlink beam selection routine 300. The downlink beam selection routine 300 begins at block 302.

At block 302, uplink signals are requested from one or more stations. For example, the uplink signals that are requested may be uplink pilot signals, and the uplink pilot signals may be requested by the AP 108A-I initiating a beam training procedure.

At block 304, a candidate set of downlink beams are determined using the uplink signals. For example, the candidate set of downlink beams may include, for each station, the transmit beam corresponding to the receive beam over which an uplink signal was received that has the highest beam or channel quality.

At block 306, the candidate set of downlink beams are provided to an AP controller. For example, the AP controller may receive candidate sets of downlink beams from multiple APs 108A-I, and may perform arbitration to select downlink beams from the set that, if used to serve the station(s), would reduce or minimize interference, taking into account the urgency or priority of packets intended for the station(s).

At block 308, a selected set of downlink beams is received from the AP controller. The selected set of downlink beams may be received with an instruction to serve one or more stations using one or more downlink beams from the selected set.

At block 310, a transmission rate is determined for the one or more stations and the selected set of downlink beams. For example, the AP 108A-I can initiate a beam training procedure to obtain channel quality feedback (e.g., SNR, SINR, etc.), and use the channel quality feedback to update the MCS. After the transmission rate is determined, the downlink beam selection routine 300 ends.

Figure 4:
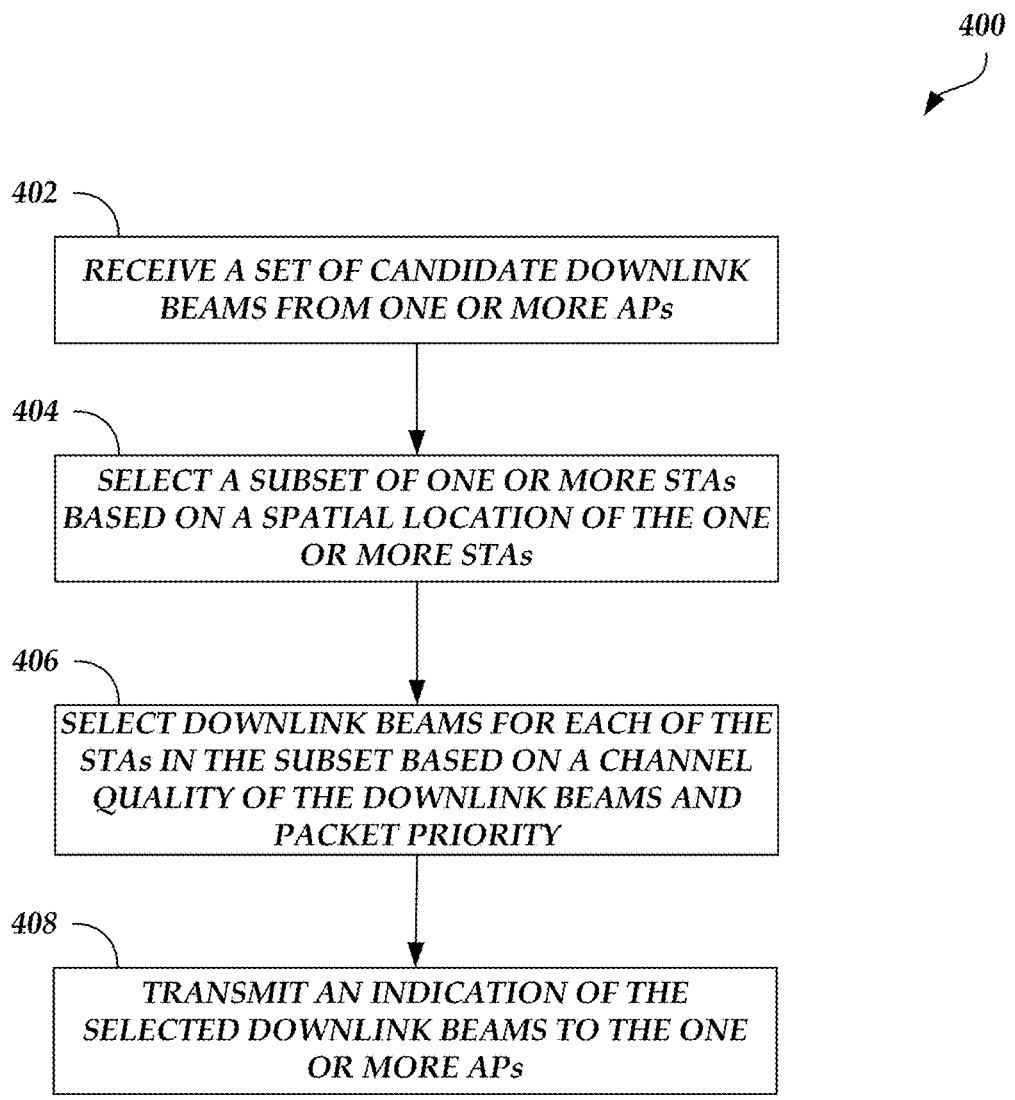
FIG. 4 is a flow diagram depicting another downlink beam selection routine illustratively implemented by an AP controller, according to one embodiment.

FIG. 4 is a flow diagram depicting another downlink beam selection routine 400 illustratively implemented by an AP controller, according to one embodiment. As an example, the AP controller 106 can be configured to execute the downlink beam selection routine 400. The downlink beam selection routine 400 begins at block 402.

At block 402, a set of candidate downlink beams is received from one or more APs. For example, each AP may select its own set of candidate downlink beams. In some cases, if the APs were to serve STAs using the selected downlink beams, interference may occur.

At block 404, a subset of one or more STAs is selected based on a spatial location of the one or more STAs. For example, the subset may include STAs that are spatially separate.

At block 406, downlink beams for each of the STAs in the subset is selected based on a channel quality of the downlink beams and packet priority. For example, the AP controller can generate one or more functions based on the channel quality of downlink beams selected for various STA and packet priority for the STAs. The downlink beams associated with the function that produces the highest sum may be selected to serve the corresponding STAs.

At block 408, an indication of the selected downlink beams are transmitted to the one or more APs. For example, the indication may include an instruction to serve one or more STAs using one or more of the selected downlink beams. After the indication is transmitted, the downlink beam selection routine 400 ends.

Figure 5:
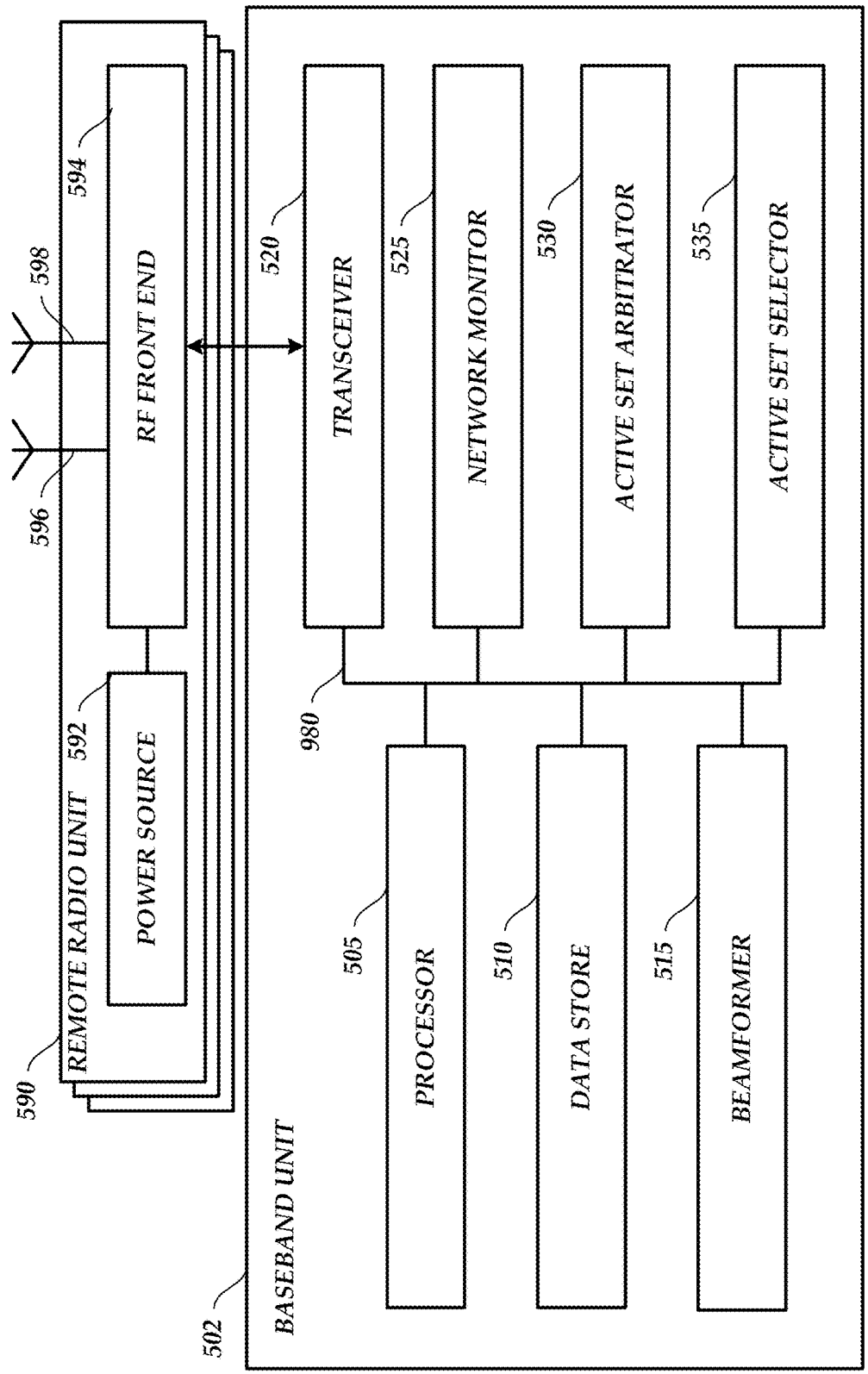
FIG. 5 is a block diagram illustrating an example baseband unit and remote radio unit according to an embodiment.

FIG. 5 is a block diagram illustrating an example baseband unit 502 and remote radio unit 590 according to an embodiment. The functionality of the baseband unit 502 may reside in an AP 108A-I. The baseband unit 502 may be coupled with at least one remote radio unit 590. The remote radio unit 590 may include at least a first antenna 596 and a second antenna 598 for MIMO wireless communications. Any antenna disclosed herein, such as the antenna 596 or the antenna 598, can be referred to as antenna element. The first antenna 596 and the second antenna 598 may be coupled with a RF front end 594. The RF front end 594 may process signals received via the first antenna 596 and the second antenna 598. Part of processing a signal may include transmitting the signal to a transceiver 520 included in the BBU 502.

A processor 505 may receive signals received by the transceiver 520. The processor 505 may be configured to determine a type of the signal. For example, if the signal includes a request for connection services, the processor 505 may provide the signal to an active set selector 535. The active set selector 535 may be configured to identify an active set of serving nodes to provide the requested downlink data transmission service. The active set selector 535 can identify the active set for a STA based on information associated with the STA. Alternatively or additionally, the active set selector 535 can identify the active set for a STA based on information associated with one or more other STAs. In some instances, the active set selector 535 can identify specific spatial beam(s) selected to serve a STA. The BBU 502 may include a network monitor 525 to detect characteristics of the network such as the number of STAs served by each RRU, network data transmission load, and/or the like. The active set selector 535 may receive the network characteristics from the network monitor 525 as a factor considered when selecting spatial beam(s) to serve a STA and/or identifying an active set for a STA.

A beamformer 515 may be included in the BBU 502 to further identify parameters for the serving nodes (e.g., RRUs) included in an active set. The parameters may include one or more of transmission mode, time, frequency, power, beamforming matrix, tone allocation, or channel rank. The beamformer 515 may determine optimal parameters for RRUs coupled with the BBU 502 that facilitate a network-wide optimization of downlink data transmissions. In some implementations, the active set selector 535 determines an active set for a STA based, in part, on information provided by the STA. In other implementations, a UE may provide a requested active set. The BBU 502 may include an active set arbitrator 530 to reconcile a requested active set with an active set selected by the active set selector 535. The active set arbitrator 530 may compare a requested set of serving nodes to the serving nodes identified by the active set selector 535. The comparison may include ordering the serving nodes according to the STA recommendation. In some implementations, the active set arbitrator 530 may provide a message to the STA indicating confirmation or other assessment for a requested active set. For example, if the STA requested nodes A and B but the BBU 502 identified only B in the active set, the message may include a code indicating a partial match for the active set. Other status codes may be included to facilitate efficient communication and assessment of requested active sets. The active set arbitrator 530 may additionally or alternatively compare a requested transmission mode to the transmission mode identified by the active set selector 535 or other element of the BBU 502.

The BBU 502 may include a data store 510. The data store 510 may include instructions that can be executed by the processor 505 to implement the features described herein. In some implementations, the data store 510 may retain active sets or other scheduling information assigned to STAs served by the BBU 502 and/or channel state information. The data store 510 may be indexed by STA identifier and/or RRU identifier. This can expedite identification of previously communicated scheduling information for the STA and for monitoring network conditions (e.g., number of STAs allocated to an RRU or antenna element of an RRU).

In addition to providing the scheduling information to the STA, the scheduling information may be used to configure the RRU 590. The configuration may include adjusting the first antenna 596 such as by frequency modulation, time modulation, altering transmission power from a power source 592, or adjusting direction, tone allocation, or beamforming of the transmission.

As discussed above, a variety of different STAs can wirelessly communicate with serving nodes in a cooperative MIMO network. An example STA will be discussed with reference to FIG. 6.

Figure 6:
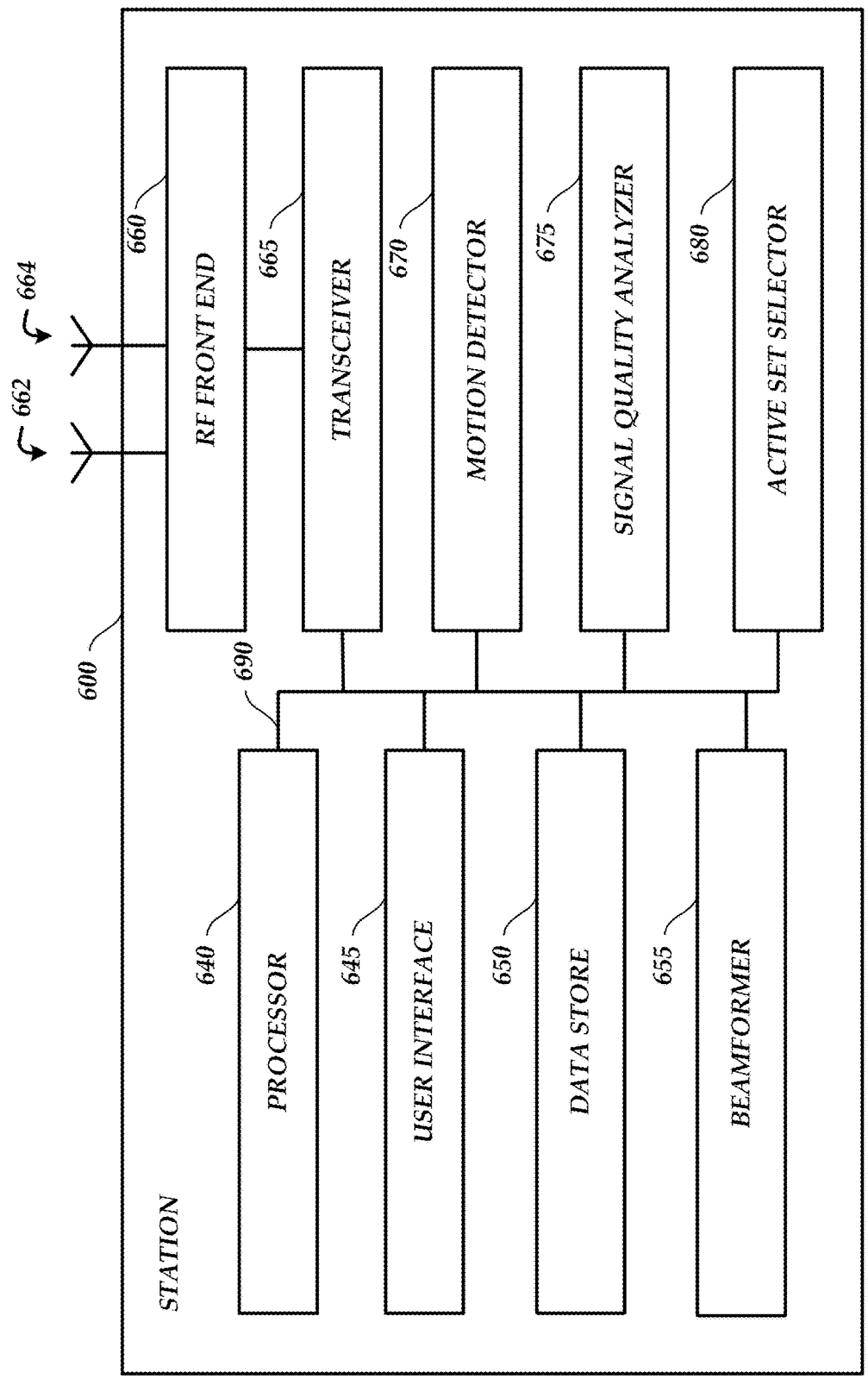
FIG. 6 is a schematic block diagram of an example STA according to an embodiment.

FIG. 6 is a schematic block diagram of an example STA 600 according to an embodiment. The STA 600 is configured for wirelessly communicating with a base station in a cooperative MIMO network. As illustrated in FIG. 6, the STA 600 includes a processor 640, a user interface 645, a data store 650, a beamformer 655, antennas 662 and 664, a transceiver 665, a motion detector 670, a signal quality analyzer 675, and an active set selector 680. Some other STAs can include additional elements and/or a subset of the elements illustrated in FIG. 6.

The STA 600 includes a plurality of antennas 662 and 664. Any suitable number of antennas can be included for wireless communication. The STA 600 can include one or more arrays of antennas. A radio frequency (RF) front end 660 can process RF signals received via the antennas 662 and 664. The RF front end can also provide RF signals to the antennas 662 and 664 for transmission. The transceiver 665 includes a transmitter and a receiver. The transceiver 665 can provide processing for transmitting and receiving RF signals associated with the antennas 662 and 664. For example, upon receiving active set data, the processor 640 can configure the transceiver 665 (e.g., receiver) to receive DL data associated with the spatial beam(s) identified in the active set data as being selected to serve the STA 600.

The processor 640 is in communication with the transceiver 665. The processor 640 is implemented by physical hardware arranged to perform specific operations to implement functionality related to determining a link strength of spatial beams over which beam pilots and/or user data are transmitted. The processor 640 can determine the link strength, identify a spatial beam that provides the best link strength, and/or generate one or more messages to report the link strength to a serving node in accordance with any suitable principles and advantages disclosed herein. The processor 640 can cause active set and neighbor set data to be stored and updated. The processor 640 can perform any other suitable processing for the STA 600.

The processor 640 can be in communication with the motion detector 670 and the signal quality analyzer 675. Accordingly, the processor 640 can receive and process information associated with conditions of the STA 600. The motion detector 670 can include any suitable hardware arranged to detect mobility information associated with the STA 600. The signal quality analyzer 675 can analyze the quality of signals received and/or transmitted by the antennas 662 and 664. This can provide information associated with a spatial channel condition of the STA 600. The information associated with conditions of the STA 600 can be provided to the processor 640 for providing to the serving node(s). In some instances, some or all of the functionality of the motion detector 670 and/or the signal quality analyzer can be implemented by the processor 640.

The active set selector 680 is optional and can identify a desired active set of one or more serving nodes. The active set selector 680 can select the desired active set based on data associated with one or more of: one or more serving nodes in the active set, one or more serving nodes in the neighbor set, mobility data associated with the UE 600, a spatial channel condition associated with the STA 600, the link strength and/or the link quality of one or more spatial beams served by one or more serving nodes, or one or more characteristics of the STA 600. The active set selector 680 can optionally execute the active set management scheme to identify a desired active set. The active set selector 680 can cause the processor 640 to generate a message for transmission to a serving node and/or a BBU to request that a selected spatial beam (or selected spatial beams) be added to an active set for the STA 600 (e.g., request that a selected spatial beam, which may be different than the spatial beam(s) already included in an active set for the STA 600, be included in an updated active set for the STA 600). The active set selector 680 can be implemented by dedicated circuitry and/or circuitry of the processor 640.

The beamformer 655 can perform any suitable beamforming functionality for the STA 600. The beamformer 655 can set and/or adjust one or more parameters associated with receiving and/or transmitting signals associated with the antennas 662 and 664 of the STA 600. The beamformer 655 can be implemented by dedicated circuitry and/or circuitry of the processor 640.

The STA 640 includes a data store 650. The data store 650 can store instructions that can be executed by the processor 640 to implement the features described herein. The data store 650 can store active set data and neighbor set data for the STA 600. The data store 650 can store spatial beam link strengths and/or link qualities. The data store 650 can store any other suitable data for the STA 600. The data store 650 can include any suitable memory elements arranged to store data.

Several elements included in the STA 600 may be coupled by a bus 690. The bus 690 can be a data bus, communication bus, other bus, or any suitable combination thereof to enable the various components of the STA 600 to exchange information.

As illustrated in FIG. 6, the STA 600 also includes a user interface 645. The user interface 645 can be any suitable user interface, such as a display and/or an audio component. In some instances, the user interface 645 can include one or more of touch screen capabilities, a button, a knob, a switch, or a slider.

Terminology, Applications, and Conclusion

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

As used herein a "transmit-receive point" (TRP) (which can alternatively be referred to as a transmission reception point) may refer to a transceiver device or one transceiver element included in a device. When included as a transceiver element, the device may include multiple TRPs. The TRP may include one or more antennas which are coupled to signal processing circuitry. The signal processing circuitry may be included in the device. The TRP may include additional elements to facilitate transmission or receipt of wireless signals for one or more UEs. Example of such elements may include a power source, amplifier, digital-to-analog converter, analog-to-digital converter, or the like. When a TRP is allocated, such as by a BBU, to provide service to a UE, the TRP may be said to be a "serving node" for the UE.

As used herein a "remote radio unit" (RRU) may refer to a device for controlling and coordinating transmission and receipt of wireless signals for one or more UEs. An RRU may include or be coupled with one or more TRPs. The RRU may receive signals from the TRP and include the signal processing circuitry. The signal processing circuitry may be selectively operated to facilitate processing of signals associated with different TRPs.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An access point controller comprising:
   a network communication device; and
   a processor in communication with the network communication device, wherein computer-executable instructions, when executed by the processor, cause the access point controller to:
   obtain a first plurality of candidate downlink beams from a first access point;
   obtain a second plurality of candidate downlink beams from a second access point;
   select a first downlink beam from the first plurality of candidate downlink beams and a second downlink beam from the second plurality of candidate downlink beams based on a channel quality of the first plurality of candidate downlink beams, a channel quality of the second plurality of candidate downlink beams, a priority of a first packet intended for a first station, and a priority of a second packet intended for a second station;
   instruct the first access point to serve the first station using the first downlink beam; and
   instruct the second access point to serve the second station using the second downlink beam.

2. The access point controller of claim 1, wherein the computer-executable instructions, when executed, further cause the access point controller to instruct the first access point to serve the first station using the first downlink beam over a first frequency channel.

3. The access point controller of claim 2, wherein the computer-executable instructions, when executed, further cause the access point controller to:
   select a third downlink beam from the first plurality of candidate downlink beams and a fourth downlink beam from the second plurality of candidate downlink beams based on the channel quality of the first plurality of candidate downlink beams, the channel quality of the second plurality of candidate downlink beams, the priority of the first packet intended for the first station, and the priority of the second packet intended for the second station;
   instruct a third access point to serve the first station using the third downlink beam over a second frequency channel different than the first frequency channel; and
   instruct a fourth access point to serve the second station using the fourth downlink beam over the second frequency channel.

4. The access point controller of claim 3, wherein the first downlink beam and the third downlink beam are spatially separated by at least a threshold distance.

5. The access point controller of claim 1, wherein the computer-executable instructions, when executed, further cause the access point controller to select the first station and the second station from a plurality of stations based on spatial positions of the first and second stations.

6. The access point controller of claim 5, wherein the first and second stations are spatially separated by at least a threshold distance.

7. The access point controller of claim 1, wherein the computer-executable instructions, when executed, further cause the access point controller to:
   generate a first function based on a first product of the priority of the first packet and a channel quality of a third downlink beam and a second product of the priority of the second packet and a channel quality of a fourth downlink beam;
   generate a second function based on a third product of the priority of the first packet and a channel quality of the first downlink beam and a fourth product of the priority of the second packet and a channel quality of the second downlink beam;
   determine that a sum of the third and fourth products is greater than a sum of the first and second products; and
   select the first downlink beam and the second downlink beam based on the sum of the third and fourth products being greater than the sum of the first and second products.

8. The access point controller of claim 7, wherein the first downlink beam is selected as a candidate by the first access point, and wherein the third downlink beam is selected as a candidate by a third access point.

9. The access point controller of claim 8, wherein the computer-executable instructions, when executed, further cause the access point controller to instruct the first access point to serve the first station using the first downlink beam instead of the third access point based on the sum of the third and fourth products being greater than the sum of the first and second products.

10. The access point controller of claim 1, wherein the first access point selects the first plurality of candidate downlink beams by initiating a beam training procedure.

11. A computer-implemented method comprising:
obtaining a first plurality of candidate downlink beams from a first access point;
obtaining a second plurality of candidate downlink beams from a second access point;
selecting a first downlink beam from the first plurality of candidate downlink beams and a second downlink beam from the second plurality of candidate downlink beams based on a channel quality of the first plurality of candidate downlink beams, a channel quality of the second plurality of candidate downlink beams, a priority of a first packet intended for a first station, and a priority of a second packet intended for a second station;
instructing the first access point to serve the first station using the first downlink beam; and
instructing the second access point to serve the second station using the second downlink beam.

12. The computer-implemented method of claim 11, wherein instructing the first access point to serve the first station using the first downlink beam further comprises instructing the first access point to serve the first station using the first downlink beam over a first frequency channel.

13. The computer-implemented method of claim 12, further comprising:
selecting a third downlink beam from the first plurality of candidate downlink beams and a fourth downlink beam from the second plurality of candidate downlink beams based on the channel quality of the first plurality of candidate downlink beams, the channel quality of the second plurality of candidate downlink beams, the priority of the first packet intended for the first station, and the priority of the second packet intended for the second station;
instructing a third access point to serve the first station using the third downlink beam over a second frequency channel different than the first frequency channel; and
instructing a fourth access point to serve the second station using the fourth downlink beam over the second frequency channel.

14. The computer-implemented method of claim 13, wherein the first downlink beam and the third downlink beam are spatially separated by at least a threshold distance.

15. The computer-implemented method of claim 11, further comprising selecting the first station and the second station from a plurality of stations based on spatial positions of the first and second stations.

16. The computer-implemented method of claim 15, wherein the first and second stations are spatially separated by at least a threshold distance.

17. The computer-implemented method of claim 11, wherein selecting the first downlink beam from the first plurality of candidate downlink beams and the second downlink beam from the second plurality of candidate downlink beams further comprises:
generating a first function based on a first product of the priority of the first packet and a channel quality of a third downlink beam and a second product of the priority of the second packet and a channel quality of a fourth downlink beam;
generating a second function based on a third product of the priority of the first packet and a channel quality of the first downlink beam and a fourth product of the priority of the second packet and a channel quality of the second downlink beam;
determining that a sum of the third and fourth products is greater than a sum of the first and second products; and
selecting the first downlink beam and the second downlink beam based on the sum of the third and fourth products being greater than the sum of the first and second products.

18. The computer-implemented method of claim 17, wherein the first downlink beam is selected as a candidate by the first access point, and wherein the third downlink beam is selected as a candidate by a third access point.

19. The computer-implemented method of claim 18, wherein instructing the first access point to serve the first station further comprises instructing the first access point to serve the first station using the first downlink beam instead of the third access point based on the sum of the third and fourth products being greater than the sum of the first and second products.

20. The computer-implemented method of claim 11, wherein the first access point selects the first plurality of candidate downlink beams by initiating a beam training procedure.

21. Non-transitory, computer-readable storage media comprising computer-executable instructions, wherein the computer-executable instructions, when executed by an access point controller, cause the access point controller to:
obtain a first plurality of candidate downlink beams from a first access point;
obtain a second plurality of candidate downlink beams from a second access point;
select a first downlink beam from the first plurality of candidate downlink beams and a second downlink beam from the second plurality of candidate downlink beams based on a channel quality of the first plurality of candidate downlink beams, a channel quality of the second plurality of candidate downlink beams, a priority of a first packet intended for a first station, and a priority of a second packet intended for a second station;
instruct the first access point to serve the first station using the first downlink beam; and
instruct the second access point to serve the second station using the second downlink beam.

* * * * *